(12) United States Patent
Ando

(10) Patent No.: US 6,195,179 B1
(45) Date of Patent: Feb. 27, 2001

(54) IMAGE READING DEVICE

(75) Inventor: Motonobu Ando, Iwakura (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/109,067

(22) Filed: Jul. 2, 1998

(30) Foreign Application Priority Data

Jul. 2, 1997 (JP) .................................................. 9-176670

(51) Int. Cl.⁷ ...................................................... H04N 1/40
(52) U.S. Cl. ........................... 358/446; 358/406; 358/474
(58) Field of Search .................................. 358/474, 406, 358/409, 443, 444–446; 348/180, 724; 381/278, 277

(56) References Cited

U.S. PATENT DOCUMENTS

| 4,145,466 | * | 3/1979 | Harasawa | 3/4 G |
| 4,325,086 |   | 4/1982 | Sato et al. | 358/296 |
| 4,660,082 | * | 4/1987 | Tomohisa et al. | 358/163 |
| 4,989,100 | * | 1/1991 | Ishima | 358/483 |
| 5,204,761 | * | 4/1993 | Gusmano | 358/461 |
| 5,303,064 | * | 4/1994 | Johnson et al. | 358/406 |
| 5,402,249 | * | 3/1995 | Koseki et al. | 358/446 |
| 5,519,441 | * | 5/1996 | Gusmano et al. | 348/207 |

FOREIGN PATENT DOCUMENTS

| 56-13868 | 2/1981 | (JP) | H04N/1/28 |
| 63-35373 U | 3/1988 | (JP) | H04N/1/40 |
| 4-346573 | 12/1992 | (JP) | H04N/1/40 |

* cited by examiner

Primary Examiner—Jerome Grant, II
Assistant Examiner—Kevin C. Kianni
(74) Attorney, Agent, or Firm—Oliff & Berridge PLC.

(57) ABSTRACT

The lamp is turned ON in S41, and the upper reference voltage memory 13a is written with the upper reference value, which is presently stored in the upper storage memory 13b and which has been determined and set as the upper reference value during the previously-executed image reading process. The increase mode flag is turned ON in S43, and the interrupt routine is started in S44 to determine the upper reference voltage to be used in the present image reading process. When the upper reference value is finally determined, the interrupt routine is terminated in S45, and the upper reference value is stored in the upper reference voltage memory 13a. The upper reference value is stored also in the upper storage memory 13b in S46. In the next image reading process, the upper reference value, stored in the upper storage memory 13b, will be written into the upper reference value memory 13a in S42. The D/A converter 41b will initially output a temporary upper reference voltage corresponding to that upper reference value. The upper reference voltage proper for being used in the present image reading process can be determined within a short period of time through repeatedly changing the temporary upper reference voltage from the thus initially-set value.

25 Claims, 13 Drawing Sheets

IMAGE READING DEVICE

BACKGROUND OF THE INVENTION

1. Field of the Invention

The present invention relates to an image reading device such as an image scanner.

2. Description of the Related Art

Recently, a multifunction peripheral device has been developed. The single multifunction peripheral device can perform many functions, such as a printer function, a facsimile function, a scanner function, and a copy function. The multifunction peripheral device is therefore convenient to be used as a peripheral device for a computer.

The multifunction peripheral device is provided with an image scanner. The image scanner includes: a lamp (scanner light source) for irradiating an original document with light; and a charge coupled device (CCD) for picking up light reflected from the original document. The CCD has a plurality of light conversion elements aligned in a line. Each light conversion element in the CCD outputs a voltage with its value corresponding to the intensity of the received light. The value of the voltage therefore represents a corresponding pixel on the original document. The voltage value (voltage data) is then converted into numeric data representing an image read from the original document.

SUMMARY OF THE INVENTION

The voltage data outputted from the CCD for each pixel may be converted into hexadecimal numeric data of "00h" to "FFh" based on the following formula (1):

$$\text{(numeric data)} = \frac{\text{(voltage data)} - \text{(lower reference voltage)}}{\text{(upper reference voltage)} - \text{(lower reference voltage)}} \times 256 \quad (1)$$

It is noted that when the voltage data is higher than the upper reference voltage, the numeric data is set to "FFh." When voltage data is lower than the lower reference voltage, the numeric data is set to "00h." That is, if (voltage data)>(upper reference voltage), (numeric data)=FFh, and if (voltage data)<(lower reference voltage), (numeric data)=00h.

Thus, values of the lower reference voltage and the upper reference voltage have to be determined prior to the voltage data conversion process.

For this reason, the image scanner may be designed to set the values of the upper and lower reference voltages before reading images from an original document. The values of the upper and lower reference voltages may be set in a manner described below.

It is now assumed that the value of the upper reference voltage should be set in a range between two (2) and four (4) volts and that the value of the lower reference voltage should be set in another range between zero (0) and one (1) volts.

First, the lamp is turned ON. A white reference plate provided in the image scanner is irradiated with light from the lamp. Receiving light reflected from the white reference plate, all the light conversion elements in the CCD generate the same input voltage 101 shown in FIG. 1(a). Simultaneously, a temporary reference voltage 102 is set to have a value of two (2) volts which is equal to the minimum value in the upper reference voltage range of 2 to 4 volts. Then, the amount of the temporary reference voltage 102 is increased one level (=(4−2)/256 volts) at a time until the temporary reference voltage 102 becomes higher than the CCD's generating input voltage 101. It is noted that when the input voltage 101 is greater than the temporary reference voltage 102, the input voltage 101 is detected as "overflow." Accordingly, the amount of the temporary reference voltage 102 is increased one level at a time until no overflow is detected. Once overflow is eliminated, the temporary reference voltage 102 is decreased one level at a time until overflow is again detected. When overflow is again detected, the temporary reference voltage 102 is increased one more level, and the resultant temporary voltage value, which is now substantially equal to the CCD's generating input voltage 101, is set as the upper reference voltage 103 as shown in FIG. 1(b).

The value of the lower reference voltage is set in the manner similar to that described above.

First, the lamp is turned OFF. The CCD is controlled to receive light reflected from the white reference plate in the dark condition. All the light conversion elements in the CCD generate the same input voltage. This input voltage is different from that generated by the CCD in the light-illuminated condition. Simultaneously, a temporary reference voltage is set to have a value of one (1) volt which is equal to the maximum value in the lower reference voltage range of zero (0) to one (1) volts. The temporary reference voltage is decreased one level ((1−0)/256 volts) at a time until the temporary reference voltage becomes lower than the input voltage. It is noted that when the input voltage is lower than the temporary reference voltage, the input voltage is detected as "underflow." Accordingly, the temporary reference voltage is decreased one level at a time until no underflow is detected. Once underflow is eliminated, the temporary reference voltage is increased one level at a time until underflow is again detected. When underflow is again detected, the temporary reference voltage is decreased one more level, and the resultant temporary reference voltage value, which is now substantially equal to the CCD's generating input voltage, is set as the lower reference voltage.

Thus, the upper reference voltage is determined by repeatedly changing the amount of the temporary reference voltage one level at a time from the minimum value of the upper reference voltage range. The lower reference voltage is determined by repeatedly changing the amount of the temporary reference voltage one level at a time from the maximum value of the lower reference voltage range. Therefore, a great deal of time is required to set each of the upper and lower reference voltages.

In addition, each time the temporary reference voltage is increased or decreased, a certain amount of time is required before the condition stabilizes. Therefore, it is impossible to detect overflow or underflow immediately after the temporary reference voltage is changed. Accordingly, it takes a certain amount of time before detecting existence of overflow or underflow.

Accordingly, in order to detect existence of overflow or underflow in a stable condition, it is conceivable to periodically execute an interrupt routine, wherein the temporary reference voltage is changed one level and overflow or underflow is detected. In this case, however, the interrupt routine has to be repeatedly performed a great number of times until the temporary reference voltage becomes substantially equal to the CCD's generating input voltage. It takes a long period of time until finally determining each of the upper and lower reference voltages.

It is therefore an objective of the present invention to overcome the above-described problems and to provide an improved image reading device that is capable of setting, within a short period of time, the reference voltage to be used for converting voltage data read from an original image into numeric data.

In order to attain the above and other objects, the present invention provides an image reading device comprising: reading means capable of reading an original image through converting the original image into voltage data; reference voltage supply means capable of supplying a reference voltage; conversion means capable of receiving the voltage data and the reference voltage and converting the voltage data into numeric data with referring to the reference voltage; and image reading control means for performing successively-executed image reading processes through repeatedly controlling the reading means to convert the original image into voltage data, the reference voltage supply means to supply the reference voltage, and the conversion means to convert the voltage data into the numeric data with referring to the reference voltage, the image reading control means setting a value of the reference voltage, to be supplied from the reference voltage supply means at each image reading process, based on another value of the reference voltage supplied from the reference voltage supply means at another image reading process which is performed immediately before the each image reading process.

The image reading control means may include reference voltage setting means for being executed at each image reading process to set the value of the reference voltage to be used for the subject image reading process based on the value of the reference voltage used at the most recently-performed image reading process.

According to another aspect, the present invention provides an image reading device, comprising: reading means for reading an original image by converting the original image into voltage data; reference voltage supply means for supplying a reference voltage; reference voltage setting means for setting a value of the reference voltage supplied by the reference voltage supply means, the reference voltage setting means setting a succeeding reference voltage based on a preceding reference voltage; and conversion means for receiving the voltage data and the reference voltage, whose value is set by the reference voltage setting means, and for converting the voltage data into numeric data with referring to the reference voltage.

The reference voltage setting means may include: temporary voltage memory means for storing a temporary reference voltage; comparison means for comparing the value of the temporary reference voltage with an input voltage produced by the reading means in a predetermined condition; temporary voltage value increasing means for, when the results of the comparison performed by the comparison means shows that the temporary reference voltage is smaller than the input voltage, increasing the value of the temporary reference voltage stored in the temporary voltage memory; temporary voltage decreasing means for, when the results of the comparison performed by the comparison means shows that the temporary reference voltage is larger than the input voltage, decreasing the value of the temporary reference voltage stored in the temporary voltage memory; determination means for repeatedly operating the temporary voltage increasing means and the temporary voltage decreasing means and setting the value of the temporary reference voltage as the reference voltage when the temporary reference voltage stored in the temporary voltage memory becomes substantially the same as the input voltage; voltage memory means for storing the reference voltage set by the determination means; and initial value setting means for setting, into the temporary voltage memory means, the reference voltage stored in the voltage memory means, as an initial value of the temporary reference voltage.

The comparison means, the temporary voltage increasing means, and the temporary voltage decreasing means may be operated by periodically-executed interrupt routine so that the temporary reference voltage is increased or decreased during one interrupt routine by the temporary voltage increasing means or the temporary voltage decreasing means and so that the comparison means compares the increased or decreased temporary reference voltage with the input voltage in the next interrupt routine.

BRIEF DESCRIPTION OF THE DRAWINGS

The above and other objects, features and advantages of the invention will become more apparent from reading the following description of the preferred embodiment taken in connection with the accompanying drawings in which:

FIG. 9 is a flowchart showing the routine for initializing upper and lower temporary reference voltages set in the upper and lower storage memories 13*b* and 13*d* when power is turned on;

DETAILED DESCRIPTION OF THE PREFERRED EMBODIMENT

Figure 1:
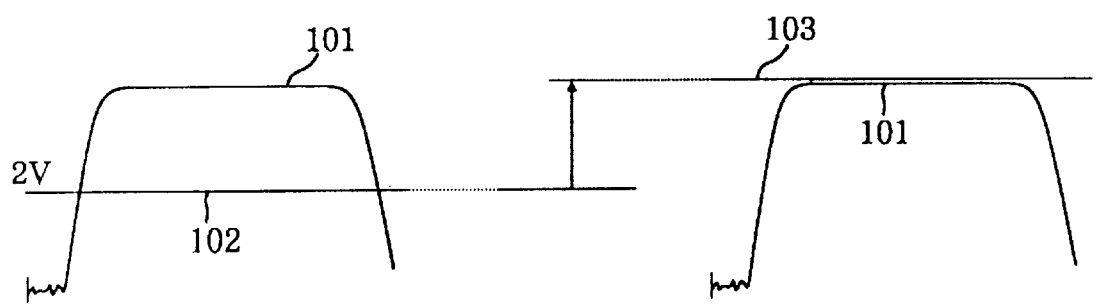
FIGS. 1(*a*) and 1(*b*) show a conceivable method how to determine an upper reference voltage, wherein FIG. 1(*a*) shows an initial relationship between a temporary upper reference voltage and a CCD's generated voltage, and FIG. 1(*b*) shows a final relationship between the determined upper reference voltage and the CCD's generated voltage.

An image reading device according to a preferred embodiment of the present invention will be described while referring to the accompanying drawings wherein like parts and components are designated by the same reference numerals to avoid duplicating description.

Figure 2:
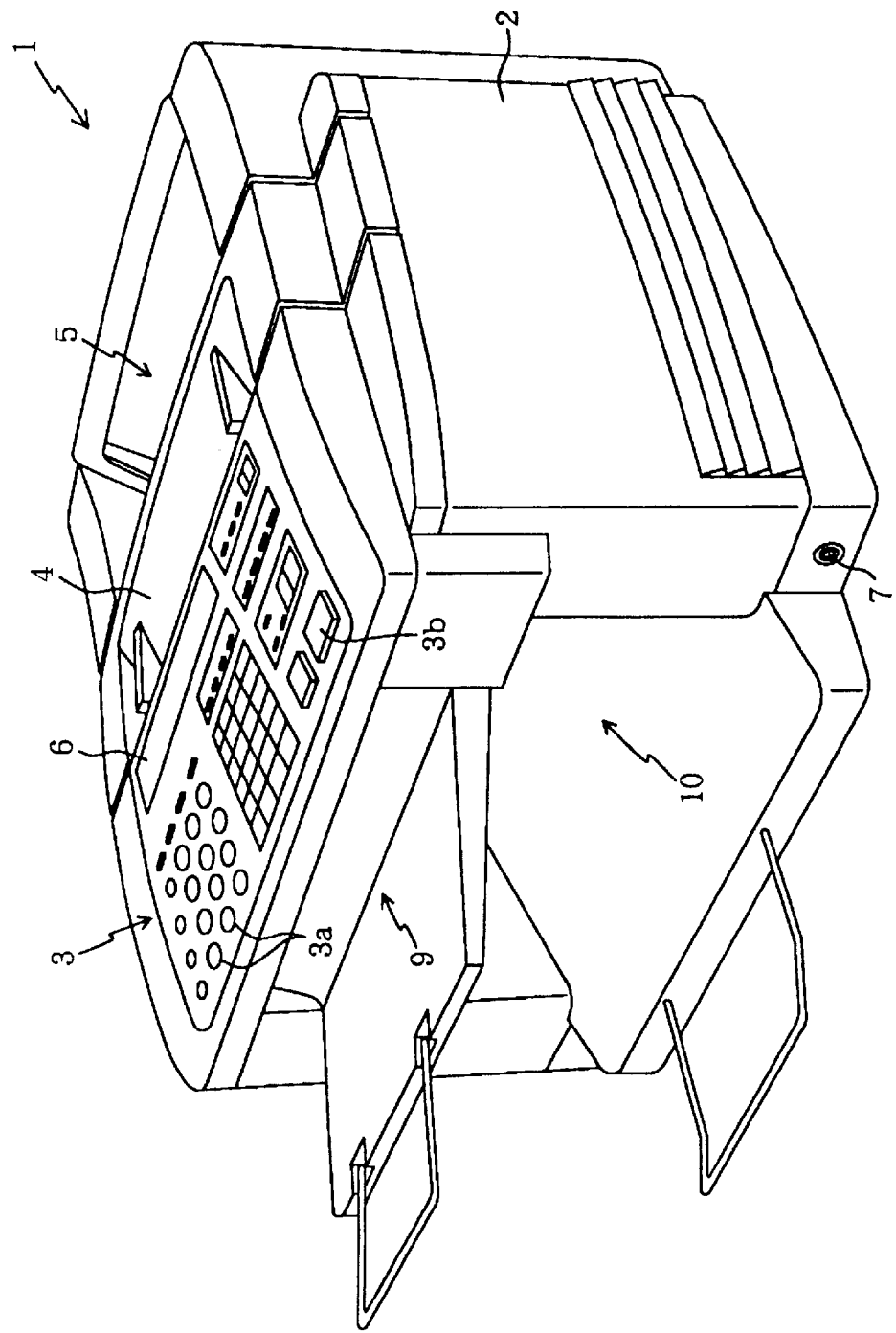
FIG. 2 is an external perspective view of a multifunction peripheral device mounted with a scanner according to an embodiment of the present invention.

FIG. 2 shows an external perspective view of a multifunction peripheral device 1 provided with an image scanner according to the embodiment of the present invention. The multifunction peripheral device 1 can perform a variety of functions, such as a facsimile function, a printer function, a scanner function, a copy function, and a video printer function.

Figure 4:
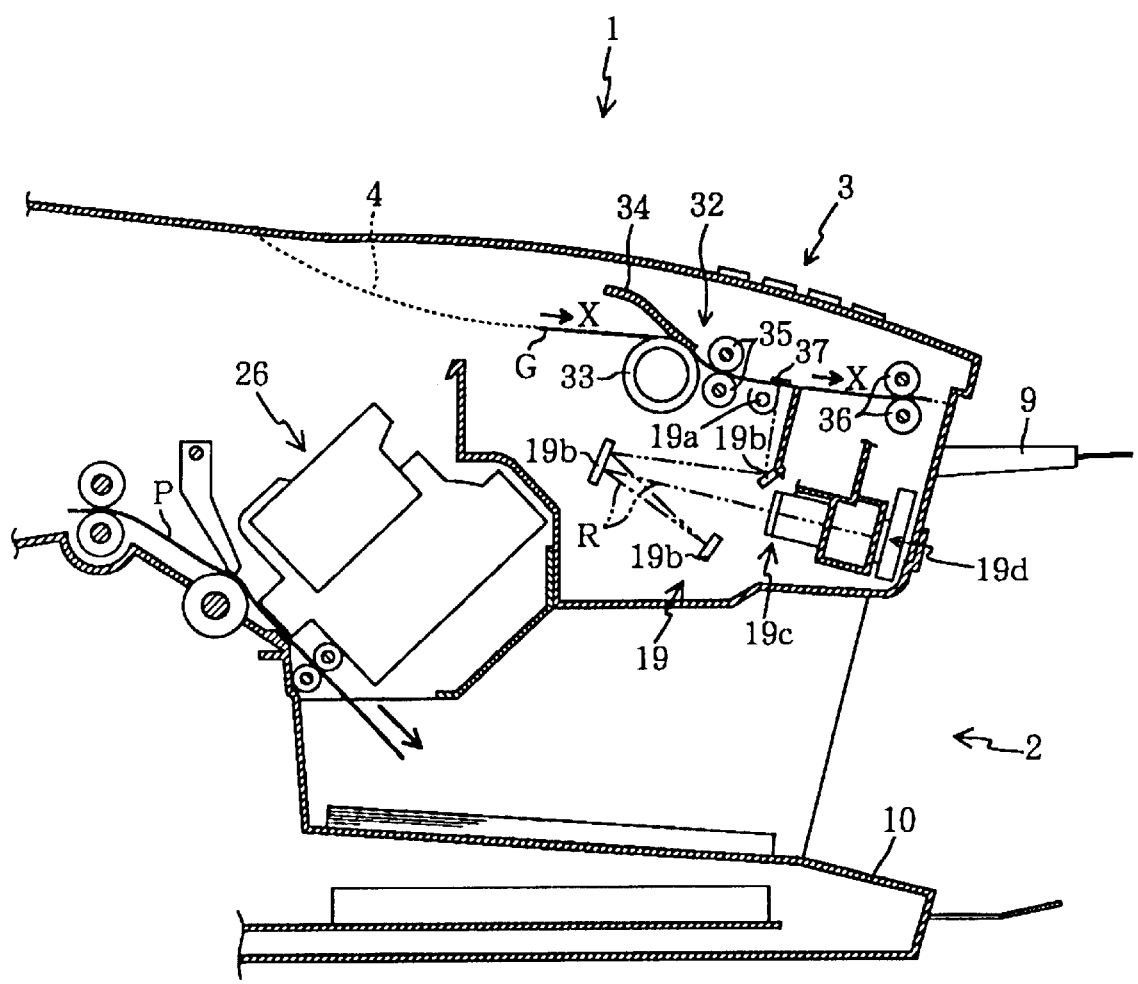
FIG. 4 is a cross-sectional view showing an internal structure of the front portion of the multifunction peripheral device, in which the scanner is mounted.

The multifunction peripheral device 1 includes a box-shaped housing 2. As shown in FIG. 4, the image scanner 19 of the present embodiment is mounted inside the housing 2. An ink jet printer 26 is mounted also inside the housing 2. The ink jet printer 26 is capable of printing in full color.

As shown in FIG. 2, an operation panel 3 is provided on an upper exterior surface of the housing 2. The operation panel 3 is provided with a variety of buttons, such as zero to nine numeric buttons 3a and a start button 3b. A user can press these buttons to control the device 1 to perform his/her desired variety of operations. A liquid crystal display (LCD) 6 is provided on the upper exterior surface of the housing 2 at the rear side of the operation panel 3. The LCD 6 is for displaying a variety of operation massages and setting conditions of the device 1 as necessary.

A document mount portion 4 is provided on the upper exterior surface of the housing 2 at the rear side of the LCD 6. A variety of documents G can be stacked on the document mount portion 4. The variety of documents G, mounted on the document mount portion 4, are transported inside the housing 2 so that an image on one surface of the document G is read out by the image scanner 19. A document discharge portion 9 is provided below the operation panel 3. The document G that has their image read by the image scanner 19 is transported to the document discharge portion 9 and discharged into a stack.

A cassette insertion portion 5 is provided to the rear of the document mount portion 4. Although not shown in the drawings, a sheet cassette capable of housing a stack of a plurality of recording sheets P can be detachably attached to the cassette insertion portion 5. When the sheet cassette is mounted in the cassette insertion portion 5, recording sheets P are supplied from the sheet cassette to the ink jet printer 26 inside the housing 2. After the supplied recording sheet P is printed on by the ink jet printer 26, it is discharged onto a recording sheet discharge port 10, which is disposed below the document discharge portion 9.

As shown in FIG. 2, a video signal input terminal 7 is provided adjacent to a lower right portion of the recording sheet discharge port 10. A video camera, for example, can be connected to the video signal input terminal 7. The video signal input terminal 7 is for receiving a video signal (image data) outputted from the video camera.

Figure 3:
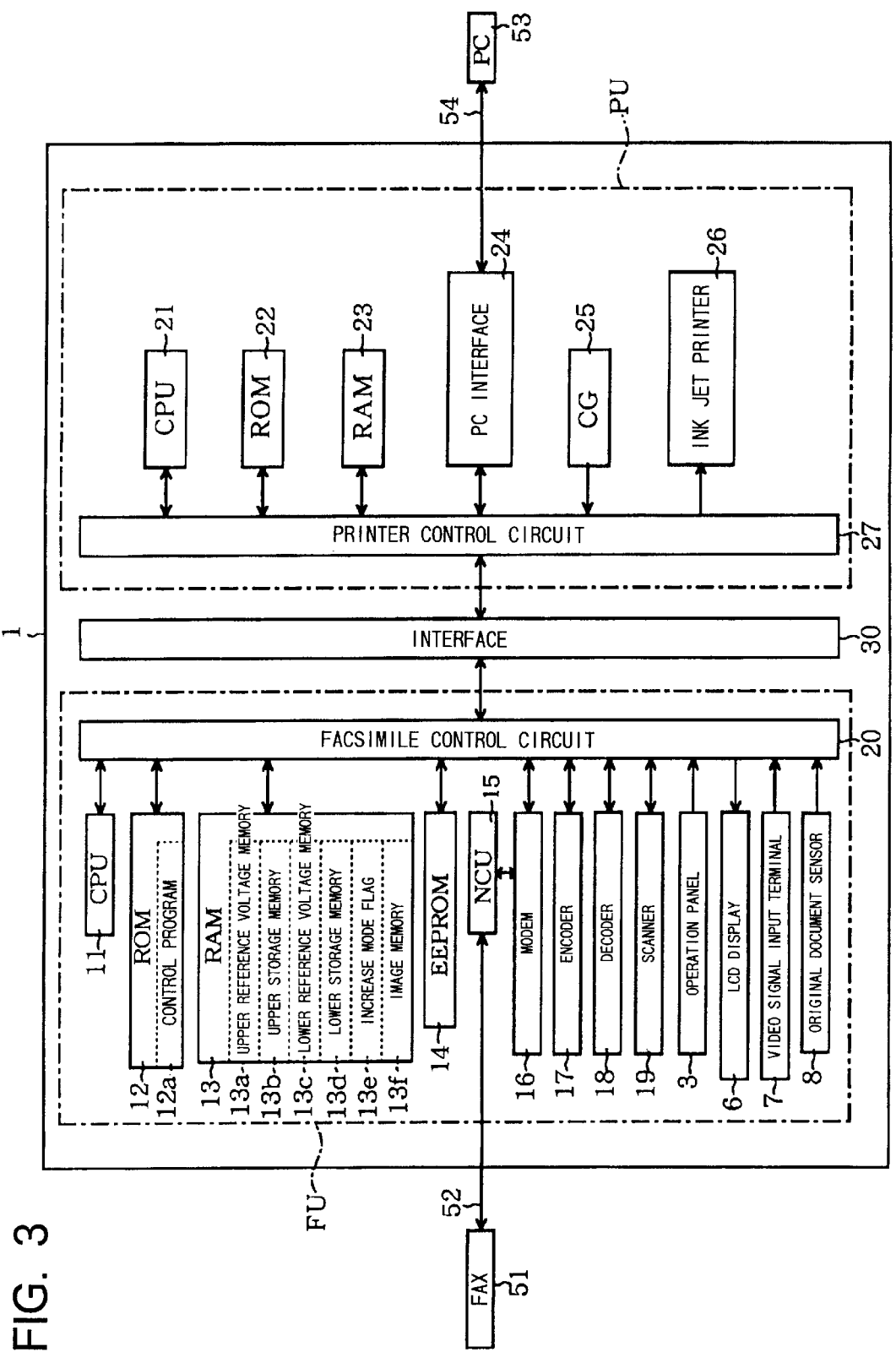
FIG. 3 is a block diagram of an electrical configuration of the multifunction peripheral device of FIG. 2.

Although not shown in FIG. 2, the multifunction peripheral device 1 is electrically connected via a cable 54 to a personal computer 53 as shown in FIG. 3.

FIG. 3 is a block diagram showing electrical configuration of the multifunction peripheral device 1. The multifunction peripheral device 1 includes two separate units, that is, a facsimile unit FU and a printing unit PU, which are connected together by an interface 30.

The facsimile unit FU includes: a CPU 11, a ROM (read only memory) 12, a RAM (random access memory) 13, EEPROM (electrically-erasable programmable ROM) 14, a network controller unit (NCU) 15, a modem 16, an encoder 17, a decoder 18, the scanner 19, the operation panel 3, the LCD 6, the video signal input terminal 7, and a document sensor 8. These components are connected together by a facsimile control circuit 20. The facsimile unit FU is connected to a remote facsimile device 51 via the NCU 15 and a telephone circuit 52.

The CPU 11 is for executing various operations, such as facsimile operation, scanner operation, copy operation, and video print operation, of the device 1 through controlling each component connected to the facsimile control circuit 20. For example, the CPU 11 executes facsimile operation based on a variety of signals transmitted and received via the NCU 15. The ROM 12 previously stores therein a variety of control programs to be executed by the multifunction peripheral device 1. The control programs stored in the ROM 12 include control programs which will be described later with reference to FIGS. 9–14. The RAM 13 is for storing a variety of data. The RAM 13 is provided with a variety of memories including: an upper reference voltage memory 13a, an upper storage memory 13b, a lower reference voltage memory 13c, a lower storage memory 13d, an increase mode flag 13e, and an image memory 13f. Details of the memories 13a through 13f will be described later.

The EEPROM 14 is a rewritable non-volatile memory. Data stored in the EEPROM 14 is therefore maintained even when a power source of the multifunction peripheral device 1 is turned off. The NCU 15 is for performing a variety of operations, such as transmitting dial signals to the telephone network (telephone circuit) 52 and responding to ring signals sent from the telephone network (telephone circuit) 52. The modem 16 is for modulating image data to be transmitted via the NCU 15 to the remote facsimile device 51 and for demodulating image data received via the NCU 15 from the remote facsimile device 51. The modem 16 is also for transmitting and receiving, via the NCU 15, a variety of procedure signals for communication control.

The encoder 17 is for encoding image data of an original document G read by the scanner 19 to compress the image data. The decoder 18 is for decoding encoded data such as received facsimile image data. The scanner 19 is for reading an image from an original document G which is inserted into the multifunction peripheral device 1 through the document mount portion 4. Details of the scanner 19 will be described later.

The document sensor 8 is for detecting presence or absence of an original document G to be read by the scanner 19. The document sensor 8 detects whether or not any original document G is mounted on the document mount portion 4.

The printing unit PU includes: a CPU 21; a ROM 22; a RAM 23; a personal computer interface 24; a character generator 25; and the ink jet printer 26. All of these components are connected together by a printer control circuit 27. The CPU 21 serves as a calculation device for controlling printing operation. The ROM 22 previously stores therein control programs and the like to be executed by the CPU 21. The RAM 23 is formed with a variety of work memories that are referred to or updated during execution of processes by the CPU 21. The RAM 23 is also formed with a print memory area for storing print data. The personal computer interface 24 is connected to the personal computer 53 via the cable 54. The personal computer interface 24 is a parallel interface conforming to Centronics standards. With using the personal computer interface 24, the multifunction peripheral device 1 can transmit and receive data in parallel to and from the personal computer 53 via the cable 54.

The character generator 25 previously stores therein vector fonts representative of characters to be printed by the ink jet printer 26. The ink jet printer 26 is of a type capable of printing in full color.

With the above-described structure, the multifunction peripheral device 1 performs various functions. For example, the device 1 performs facsimile operation when a facsimile original is mounted on the document mount portion 4. Image on the facsimile original is read out by the image scanner 19, and data of the read out image is transmitted to the remote facsimile device 51. The device 1 also performs copy operation when a copy document is mounted on the document mount portion 4. Image on the copy document is read out by the image scanner 19, and data of the read out image is printed by the ink jet printer 26 onto recording sheets P.

The device 1 performs video printing operation when receiving a video signal via the video signal input terminal 7. The received video signal is printed in full color by the ink jet printer 26.

The device 1 also performs scanning operation when a scanning original is mounted on the document mount portion 4. Image on the scanning original is read out by the image scanner 19, and data of the read out image is transmitted to the personal computer 53 via the cable 54.

The device 1 performs printing operation when receiving print data from the personal computer 53 via the cable 54. The received print data is printed by the ink jet printer 26 onto recording sheets P.

The scanner 19 will be described below in greater detail with referring to FIGS. 4 to 7.

As apparent from FIG. 4, the scanner 19 is disposed at the upper front portion of the ink jet printer 26 and below the operation panel 3. A transport pathway 32 is formed below the operation panel 3. Documents G stacked on the document mount portion 4 are transported though the transport pathway 32 one sheet at a time toward the document discharge portion 9.

A separation roller 33 is disposed on the transport pathway 32 at its upstream side end in an original transport direction X. A separation rib 34 is provided in opposition to and in abutting contact with the separation roller 33. Rotation of the separation roller 33 operates in association with the separation rib 34 to separate one original document G at a time from the stack on the document mount portion 4, and feeds each separated original document G toward the transport pathway 32.

In the downstream side of the separation roller 33 in the original transport direction X, there are disposed: a pair of transport rollers 35 and 35, a white reference plate 37, and a pair of discharge rollers 36 and 36 in this order. Each original document G, fed from the document mount portion 4 by the separation roller 33, is transported by the pair of transport rollers 35 and 35 along the transport pathway 32 in a direction from the white reference plate 37 to the pair of discharge rollers 36 and 36. The original document G is then discharged onto the document discharge portion 9 by the discharge rollers 36 and 36.

The white reference plate 37 is a thin plate having at least one surface colored white. The white reference plate 37 is fixedly mounted on the transport pathway 32 with its white color surface facing downward. The white reference plate 37 defines an image reading position where image is read from each original document G. Each original document G is transported along the pathway 32 with its surface, desired to be read, facing downward. When the original document G passes the image reading position, i.e., below the white reference plate 37, image is read out from the lower surface of the document G.

The scanner 19 includes: a lamp 19a, a plurality of reflection mirrors 19b, and a condenser lens 19c, and a charge coupled device (CCD) 19d.

The lamp (light source) 19a is disposed below the white reference plate 37 so that the pathway 32 is sandwiched between the lamp 19a and the white reference plate 37. The lamp 19a is for irradiating, with light, the lower surface of each original document G which is passing below the white reference plate 37. The light is reflected from the lower surface of the original document G to form reflection light R whose intensity corresponds to the image on that surface.

The plurality of reflection mirrors 19b are also disposed below the white reference plate 37. The reflection mirrors 19b are for changing the path of the reflection light R to allow the reflection light R to fall incident on the condenser lens 19c. The condenser lens 19c is for gathering the reflection light R and directs the reflection light R toward the CCD 19d. The CCD 19d has a plurality of light conversion elements aligned in a line. Each light conversion element of the CCD 19d is for outputting a voltage value (input voltage data) corresponding to the intensity of the received reflection light R. The CCD 19d outputs the input voltage data in the form of an analog signal.

Figure 5:
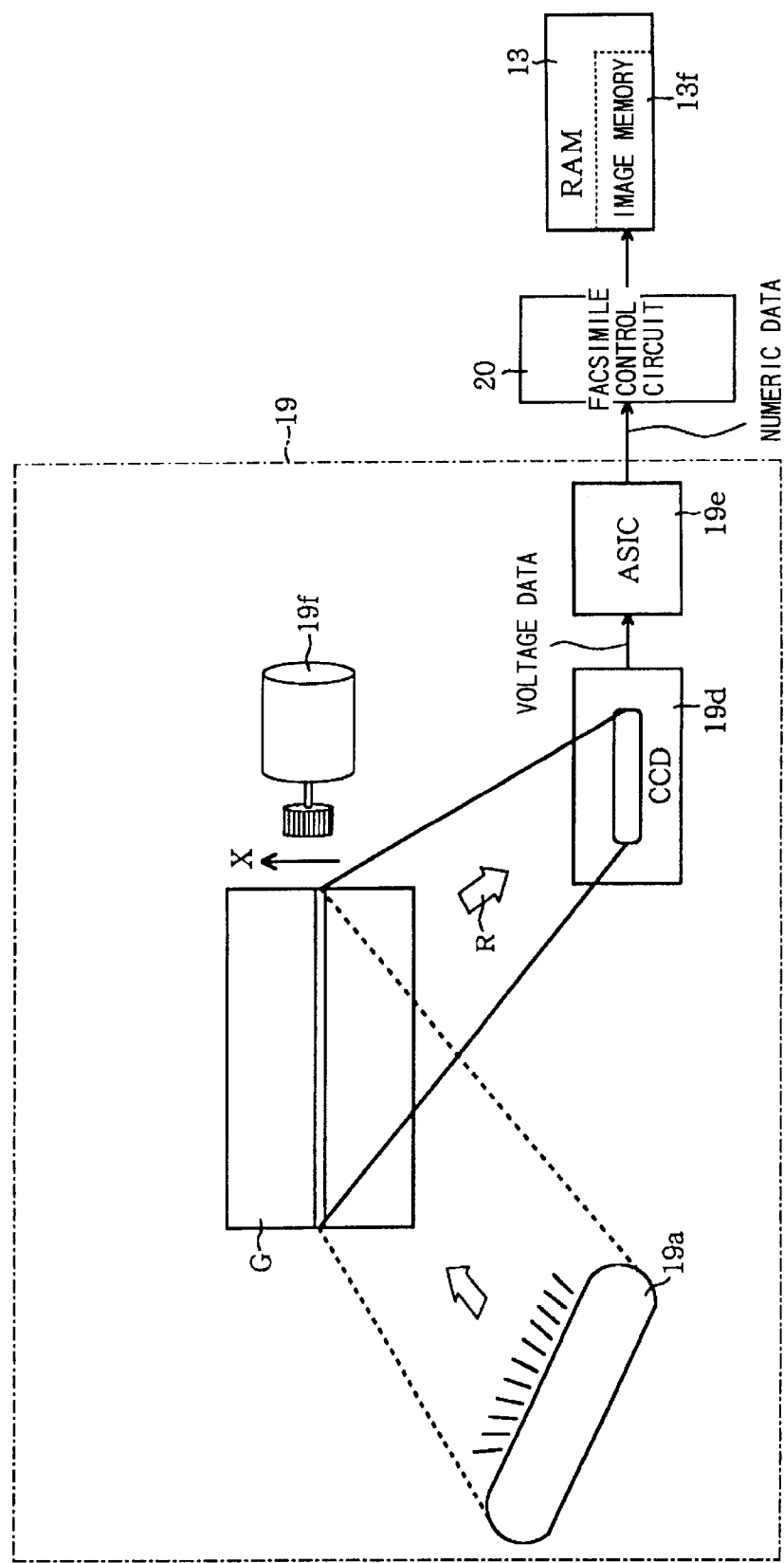
FIG. 5 is a schematic view showing configurations of the scanner.

As shown in FIG. 5, the scanner 19 is also provided with a motor 19f for driving the separation roller 33, the pair of transport rollers 35 and 35, and the pair of discharge rollers 36 and 36. An ASIC (Application Specified Integrated Circuit) 19e is provided in the scanner 19. The ASIC 19e is for receiving the analog input voltage data outputted from the CCD 19d. The ASIC 19e is for converting the received analog input voltage data into digital numeric data and then for subjecting the digital numeric data to various image correction operations to produce image data indicative of the read out image.

With this structure, the scanner 19 operates as described below.

When the motor 19f drives the separation roller 33, the pair of transport rollers 35 and 35, and the pair of discharge rollers 36 and 36, the original document G is transported in the downstream direction indicated by an arrow X shown in FIGS. 4 and 5. Light irradiated onto this original document G is reflected from the surface of the original document G, and falls incident on the CCD 19d as reflection light R. Each light conversion element of the CCD 19d converts the reflection light R into a voltage value (input voltage data) indicative of the intensity of the reflection light R. The input voltage data therefore represents a corresponding pixel on the original image. The input voltage data is supplied from the CCD 19d to the ASIC 19e. In the ASIC 19e, the input voltage data is converted into numeric data, and the numeric data is corrected into image data. The image data is transferred via the facsimile control circuit 20 and is written into the image memory 13f in the RAM 13. Thus, image of the original document G is read as image data.

The ASIC 19e will be described below in greater detail.

Figure 6:
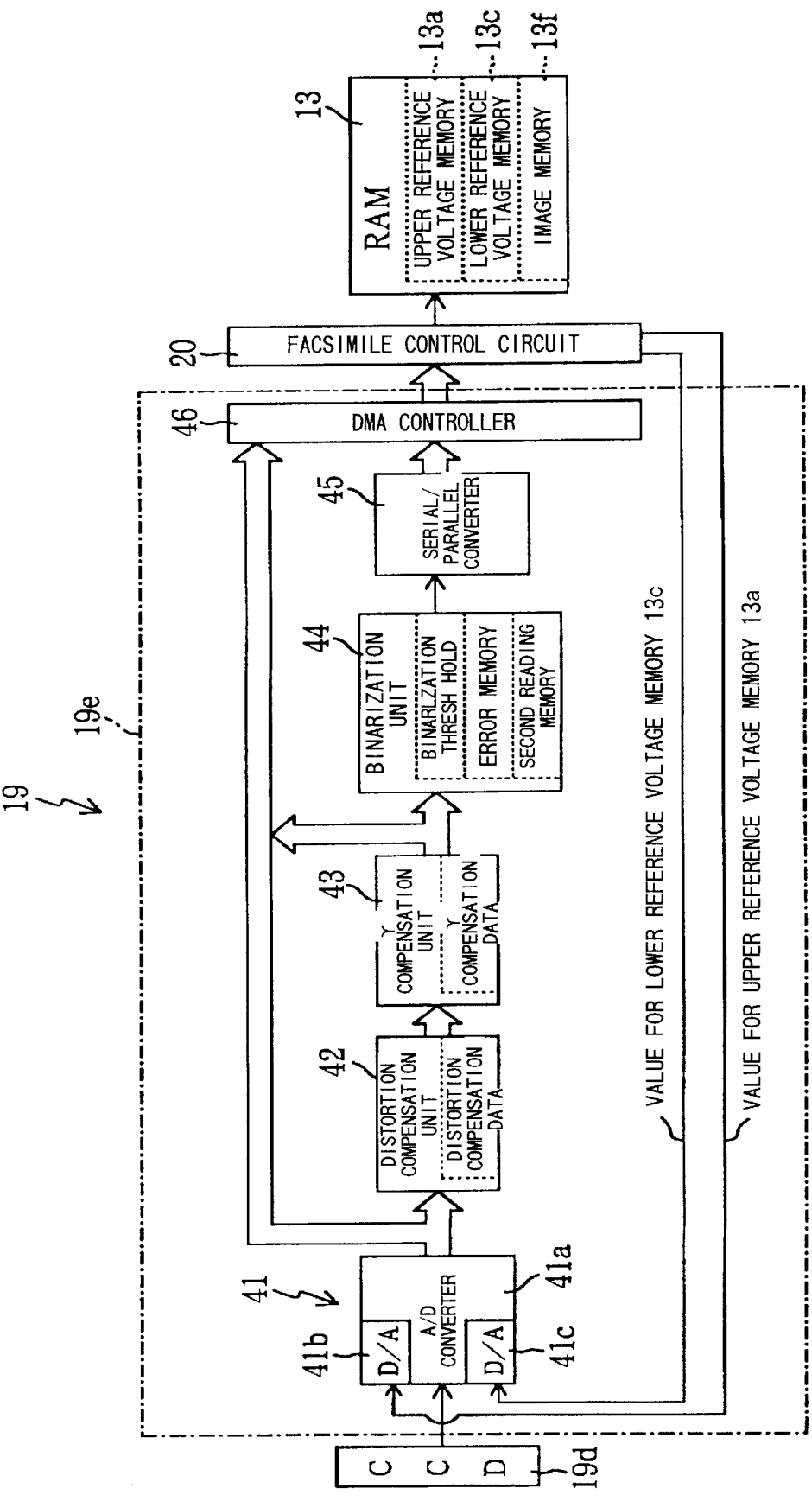
FIG. 6 is a schematic view showing configuration of an ASIC provided in the scanner.

As shown in FIG. 6, the ASIC 19e includes: an A/D converter 41; a distortion compensation unit 42; a γ (gamma) compensation unit 43; a binarization unit 44; a serial/parallel converter 45; and a DMA (dynamic memory access) controller 46.

The A/D converter 41 is for receiving the analog input voltage data outputted from the CCD 19d. The A/D converter 41 is for converting the analog input voltage data into numeric data in the form of an eight bit digital signal and for outputting the numeric data both to the distortion compensation unit 42 and to the DMA controller 46. The DMA controller 46 is for performing a known distortion compensation data production process based on the numeric data outputted to the DMA controller 46. The distortion compensation unit 42 is for performing a known distortion compensation process onto the received numeric data based on the DMA controller's produced distortion compensation data. The distortion compensation unit 42 outputs the distortion-compensated numeric data to the γ compensation unit 43.

The γ compensation unit 43 is prestored with γ (gamma) compensation data of a fixed value. The γ compensation unit 43 is for subjecting the received numeric data to a known γ compensation process with using the γ compensation data. The γ compensation unit 43 outputs the γ compensated data to the binarization unit 44.

The binarization unit 44 is for receiving the distortion-compensated and γ-compensated numeric data, and for binarizing the received numeric data into binary data through a simple binarization method or an error-diffusion binarization method. The binarization unit 44 outputs the produced binary data one bite at a time to the serial/parallel converter 45.

The serial/parallel converter 45 is for gathering the serially-supplied binary data into eight bit units, and for outputting each group of eight bit unit to the DMA controller 46 as one bite of image data. The DMA controller 46 outputs each single bite of image data to the facsimile control circuit 20, which in turn writes the received image data in the image memory 13f.

It is noted that the distortion-compensated and γ-compensated numeric data can be outputted directly to the DMA controller 46 from the γ compensation unit 43 without passing through the binarization unit 44 and the serial/parallel converter 45. In this case, one dot data is constructed from eight bit multilevel data, and is supplied via the facsimile control circuit 20 to the image memory 13f.

Thus, the document image is retrieved as analog input voltage data by the CCD 19d, converted into eight bit numeric data by the A/D converter 41, and then converted into image data by the above-described various processes attained by the units 42–45 or 42–43. The image data is then temporarily stored in the image memory 13f.

The image memory 13f, provided in the RAM 13, serve to temporarily store the image data of the document G. During the facsimile mode, the image data will be transmitted to the remote facsimile device 51. During the copy mode, the image data will be printed out on the recording sheets P. During the scanner mode, the image data will be supplied via the cable 54 to the personal computer 53.

Figure 7:
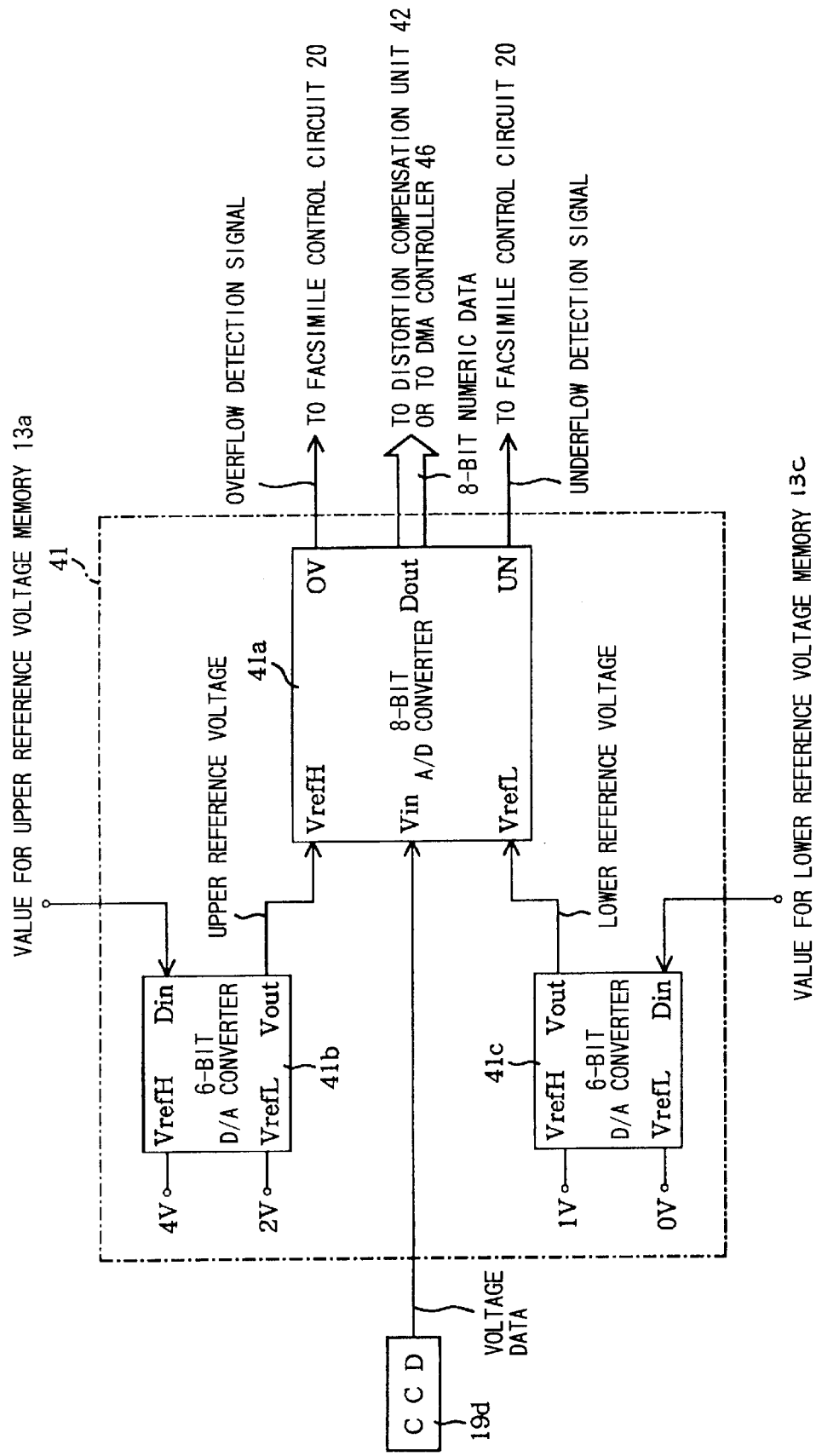
FIG. 7 is a circuit diagram of an A/D converter mounted in the ASIC.

The A/D converter 41 will be described below in greater detail while referring to FIG. 7.

The A/D converter 41 includes: an eight bit A/D converter 41a, and a pair of six bit D/A converters 41b and 41c. The eight bit A/D converter 41a is for converting the analog voltage value (input voltage data) inputted from the CCD 19d into digital eight bit numeric data and for outputting the eight bit numeric data.

The D/A converter 41b is for receiving, via the facsimile control circuit 20, an upper reference value (six bit numeral value) stored in the upper reference voltage memory 13a, and for generating an analog upper reference voltage whose value corresponds to the received upper reference value.

The D/A converter 41b is provided with: three input terminals Din, VrefH, and VrefL, and one output terminal Vout. The input terminal Din is for receiving the six bit numeric value of the upper reference data from the upper reference voltage memory 13a. The input terminal VrefH is continuously applied with an analog voltage of four (4) volts. The input terminal VrefL is continuously applied with an analog voltage of two (2) volts. The D/A converter 41b is designed to convert the received six bit numeric value (digital value) of the upper reference data into analog voltage data and to output, at the output terminal Vout, the analog voltage data as the upper reference voltage. More specifically, when the received digital upper reference value is "00h," the output terminal Vout outputs an upper reference voltage of two (2) volts. When the received digital upper reference value is "3Fh," the output terminal Vout outputs an upper reference voltage of four (4) volts. In this way, the D/A converter 41b can change the upper reference voltage, to be outputted from the output terminal Vout, in accordance with changes in the received digital upper reference value.

The other D/A converter 41c is for receiving, via the facsimile control circuit 20, a lower reference value (six bit numeric value) stored in the lower reference voltage memory 13c, and for generating an analog lower reference voltage whose value corresponds to the received lower reference value.

The D/A converter 41c is provided with: three input terminals Din, VrefH, and VrefL, and one output terminal Vout. The input terminal Din is for receiving the six bit numeric value of the lower reference data from the lower reference voltage memory 13c. The input terminal VrefH is continuously applied with an analog voltage of one (1) volt. The input terminal VrefL is continuously applied with an analog voltage of zero (0) volt. The D/A converter 41c is designed to convert the received six numeric value (digital value) of the lower reference data into analog voltage data and to output, at the output terminal Vout, the analog voltage data as the lower reference voltage. More specifically, when the received digital lower reference value is "00h," the output terminal Vout outputs a lower reference voltage of zero (0) volt. When the received digital upper reference value is "3Fh," the output terminal Vout outputs a lower reference voltage of one (1) volt. In this way, the D/A converter 41c can change the lower reference voltage, to be outputted from the output terminal Vout, in accordance with changes in the received digital lower reference value.

The A/D converter 41a is for receiving the analog upper reference voltage from the D/A converter 41b and for receiving the analog lower reference voltage from the D/A converter 41c. The A/D converter 41a is also for receiving the analog input voltage data generated by the CCD 19d. The A/D converter 41a is for converting the analog input voltage data into eight bit digital numeric data (hexadecimal numeric data) through the already-described formula (1) with using the received upper and lower reference voltages. The A/D converter 41a is also for comparing the input voltage data with the upper reference voltage, and for generating an overflow detection signal when the input voltage data is higher than the upper reference voltage. The A/D converter 41a is also for comparing the input voltage data with the lower reference voltage, and for generating an underflow detection signal when the input voltage data is lower than the lower reference voltage.

The A/D converter 41a is provided with: three input terminals Vin, VrefH, and VrefL, and three output terminals Dout, OV and UN. The input terminal Vin is for receiving the analog voltage value (input voltage data) inputted from the CCD 19d. The input terminal VrefH is for receiving the upper reference voltage supplied from the D/A converter

41b. The input terminal VrefL is for receiving the lower reference voltage supplied from the D/A converter 41c. The A/D converter 41a is designed to convert the analog input voltage data, received at the terminal Vin, into hexadecimal numeric data of "00h" to "FFh" according to the formula (1) with using the upper and lower reference voltages inputted to the terminals VrefH and VrefL. The A/D converter 41a outputs the thus obtained hexadecimal numeric data via the output terminal Dout, which is connected to the distortion compensation unit 42 and to the DMA controller 46. The A/D converter 41a is also designed to produce an overflow detection signal when the input voltage data is higher than the upper reference voltage and to produce an underflow detection signal when the input voltage data is lower than the lower reference voltage. The A/D converter 41a outputs the overflow detection signal via the output terminal OV, which is connected to the facsimile control circuit 20. The A/D converter 41a outputs the underflow detection signal via the output terminal UN, which is also connected to the facsimile control circuit 20.

For example, when the input terminal Vin receives input analog voltage data equal to the upper reference voltage inputted via the terminal VrefH, then the output terminal Dout will output a hexadecimal number of "FFh". When the input terminal Vin receives input analog voltage data equal to the lower reference voltage inputted via the terminal VrefL, then the output terminal Dout will output another hexadecimal number of "00h". When the input terminal Vin receives input analog voltage data which is equal to a central value between the upper and lower reference voltages, then the output terminal Dout will output still another hexadecimal number of "80h," which is a central value between the hexadecimal numbers of "00h" and "FFh". When the input terminal Vin receives input analog voltage data higher than the upper reference voltage, then the output terminal OV will output an overflow detection signal. When the input terminal Vin receives input analog voltage data lower than the lower reference voltage, then the output terminal UN will output an underflow detection signal.

The upper reference voltage memory 13a is for storing the upper reference value and for supplying the upper reference value to the D/A converter 41b via the facsimile control circuit 20 so that the D/A converter 41b can generate the upper reference voltage whose value corresponds to the upper reference value.

The upper reference value is used for causing the D/A converter 41b to produce the upper reference voltage so that the A/D converter 41a can properly convert the input voltage data into eight bit numeric data through the formula (1) with using the upper reference voltage. It is noted that the upper reference voltage memory 13a is designed to update the upper reference value each time the device 1 is to perform the facsimile function, the copy function, or the scanner function. More specifically, every time the device 1 is instructed to perform the facsimile function, the copy function, or the scanner function, the device 1 starts executing an image reading process of FIG. 10, in which the upper reference value is newly updated in the process of S13.

Figure 14:
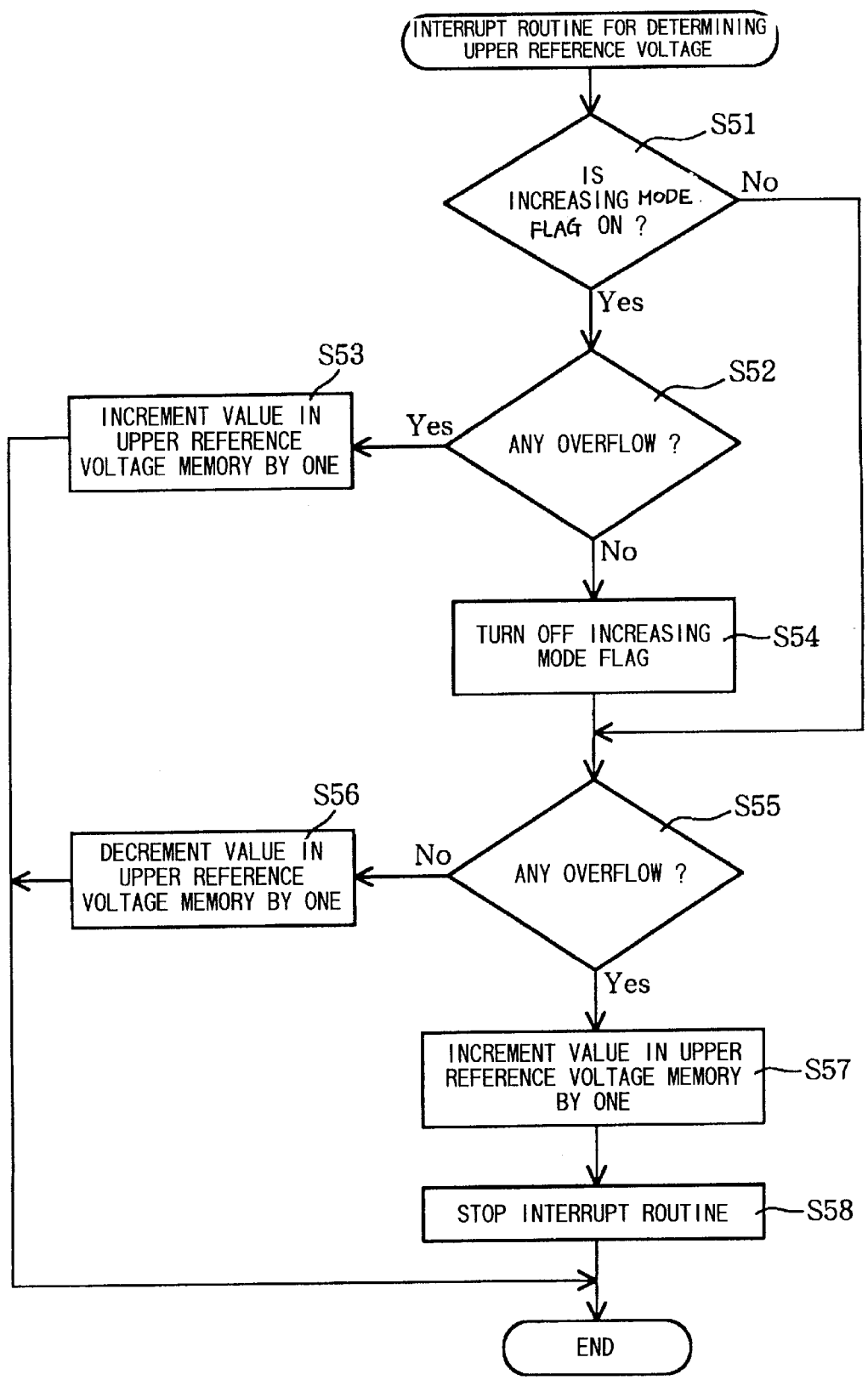
FIG. 14 is a flowchart showing an interrupt routine for determining the upper reference voltage.

In the process of S13, in order to update the upper reference value, an interrupt routine shown in FIG. 14 is repeatedly executed. During this interrupt routine, the upper reference value is used to cause the D/A converter 41b to produce a temporary upper reference voltage whose value corresponds to the upper reference value. The upper reference value in the memory 13a is repeatedly changed so that the temporary upper reference voltage repeatedly changes until finally reaching such a value as properly corresponds to the present characteristic of the CCD 19d under its light illuminated condition. The finally-obtained value is set as the newly-updated upper reference value to be used in the present image reading operation.

Figure 10:
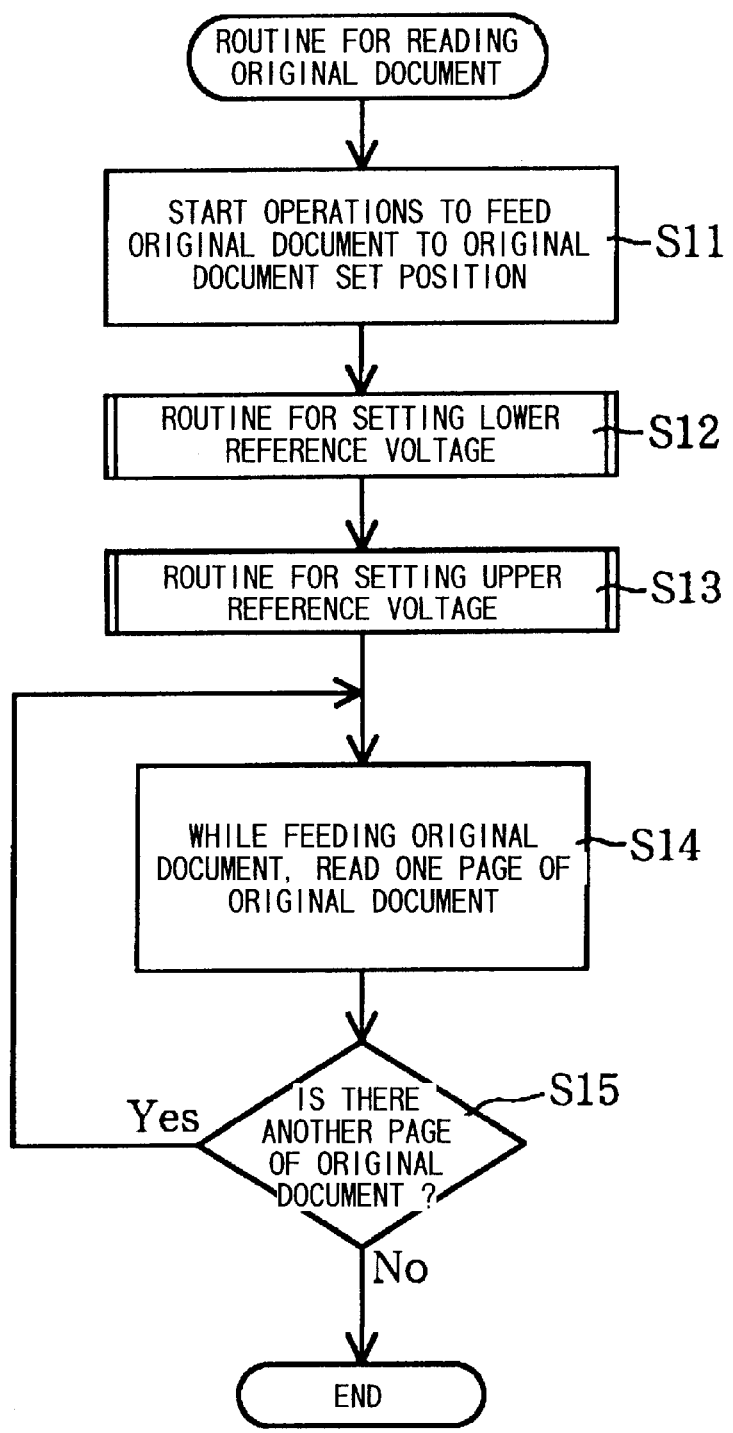
FIG. 10 is a flowchart showing a routine for reading image from an original document.

The upper storage memory 13b is for storing the upper reference value thus updated in the process of S13 in each image reading process of FIG. 10. The upper reference value, thus stored in the memory 13b at each image reading process, will be used during its next image reading process as an initial value for causing the D/A converter 41b to initially produce the temporary upper reference voltage. Accordingly, during the updating process of S13 in the next image reading process of FIG. 10, the D/A converter 41b will first produce the temporary upper reference voltage, whose value corresponds to the value set in the memory 13b in the present process.

The lower reference voltage memory 13c is for storing the lower reference value and for supplying the lower reference value to the D/A converter 41c via the facsimile control circuit 20 so that the D/A converter 41c can generate the lower reference voltage whose value corresponds to the lower reference value.

The lower reference value is used for causing the D/A converter 41c to produce the lower reference voltage so that the A/D converter 41a can properly convert the input voltage data into eight bit numeric data through the formula (1) with using the lower reference voltage. It is noted that the lower reference voltage memory 13c is designed to update the lower reference value each time the device 1 is to perform the facsimile function, the copy function, or the scanner function. More specifically, every time the device 1 is instructed to perform the facsimile function, the copy function, or the scanner function, the device 1 starts executing an image reading process of FIG. 10, in which the lower reference value is newly updated in the process of S12.

Figure 12:
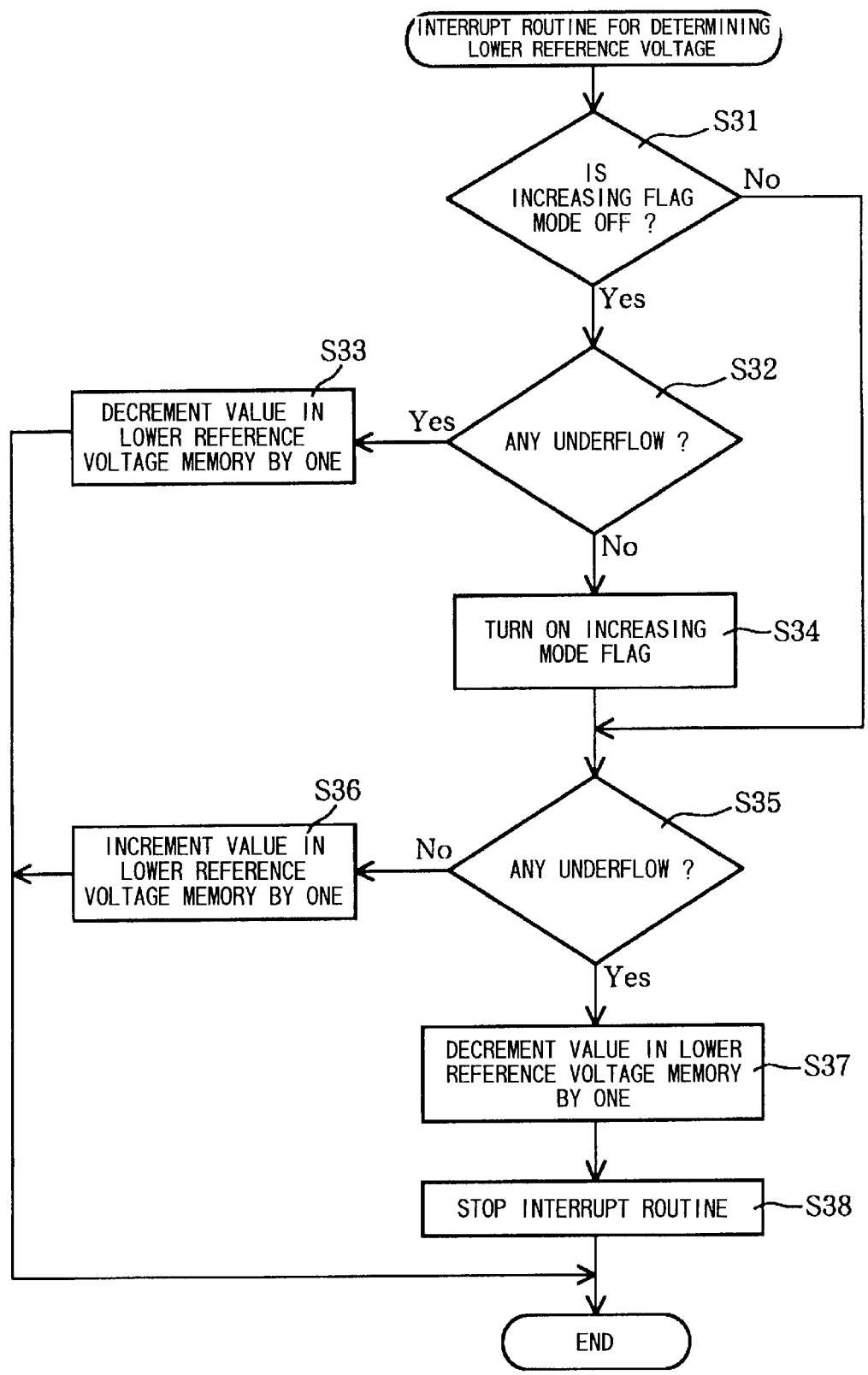
FIG. 12 is a flowchart showing an interrupt routine for determining the lower reference voltage.

In the process of S12, in order to update the lower reference value, an interrupt routine shown in FIG. 12 is repeatedly executed. During this interrupt routine, the lower reference value is used to cause the D/A converter 41c to produce a temporary lower reference voltage whose value corresponds to the lower reference value. The lower reference value in the memory 13c is repeatedly changed so that the temporary lower reference voltage repeatedly changes until finally reaching such a value as properly corresponds to the present characteristic of the CCD 19d under its dark condition. The finally-obtained value is set as the newly-updated lower reference value to be used in the present image reading operation.

The lower storage memory 13d is for storing the lower reference value thus updated in the process of S12 in each image reading process of FIG. 10. The lower reference value, thus stored in the memory 13d at each image reading process, will be used during its next image reading process as an initial value for causing the D/A converter 41c to initially produce the temporary lower reference voltage. Accordingly, during the updating process of S12 in the next image reading process of FIG. 10, the D/A converter 41c will first produce the temporary lower reference voltage, whose value corresponds to the value set in the memory 13d in the present process.

The increase mode flag 13e is for indicating whether the temporary upper and lower reference voltages should be increased or decreased during the interrupt routines of FIGS. 12 and 14. When the increase mode flag 13e is turned on, the temporary upper and lower reference voltages will be increased. When the increase mode flag 13e is turned off, on the other hand, the temporary upper and lower reference voltages will be decreased. It is noted that the increase mode flag 13e is initially set in the ON condition at the start of the upper reference value updating process of S13. The increase mode flag 13e is initially set in the OFF condition at the start of the lower reference value updating process of S12.

With the above-described structure, the facsimile unit FU in the device 1 operates as described below while referring to the flowcharts shown in FIGS. 9 to 14.

Figure 9:
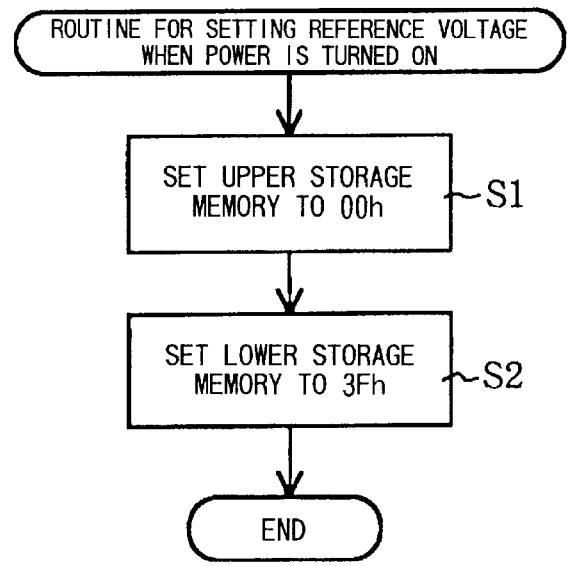

When power of the device 1 is turned ON, the facsimile unit FU starts a reference voltage initialization routine shown in FIG. 9. In this routine, upper and lower reference values are initialized to be stored in the upper and lower storage memories 13b and 13d. That is, in S1, the minimum six bit numeral value of "00h" in the range of "00h" to "3Fh" is set in the upper storage memory 13b. In S2, the maximum six bit numeral value "3Fh" in the same range is set in the lower storage memory 13d. Then, the initialization routine is ended.

Every time when the facsimile unit FU is instructed to perform the facsimile operation, the copy operation, or the scanner operation, the facsimile unit FU starts executing the image reading process of FIG. 10. This image reading process is executed for reading image from an original document G desired to be subjected to the instructed operation.

When this image reading routine of FIG. 10 is started, the motor 19f is first energized in S11 to drive the separation roller 33 and the transportation rollers 35 and 35 to start transporting a first page of the original document G to a document set position. It is noted that the document set position is located directly before the image reading position where the white reference plate 37 is located. Simultaneously, the CCD 19d is also energized into a condition capable of converting received light into analog input voltage data.

While the first page of the original document G is being transported toward the document set position by the rollers 33 and 35, processes of S12 and S13 are executed for setting or updating the lower and upper reference voltages. After the lower and upper reference voltages are set in S12 and S13, the A/D converter 41 is brought into a condition capable of properly converting input voltage data issued from the CCD 19d into numeric data.

Accordingly, after the upper and lower reference voltages have been set in S12 and S13 and when the first page of the original document G reaches the document set position, the program proceeds to S14. In S14, image is read out from the page of the original document G that is being transported through the image reading position. During this image reading process of S14, the original document image is first read as input voltage data by the CCD 19d, and then is converted into numeric data by the A/D converter 41 through the formula (1) with using the lower and upper reference voltages set in S12 and S13. Then, the numeric data is subjected to distortion compensation and γ compensation by the elements 42 and 43, subjected to binarization by the element 44, and then written in the image memory 13f as image data.

When image from one page of the original document G has been completely read, the program proceeds to S15, in which it is judged, based on a signal supplied from the document sensor 8, whether or not there is another page of the original document G to be read. If there exists another succeeding page (Yes in S15), then the process of S14 is repeated to read image from the next page of the document G. On the other hand, when there is no succeeding page (No in S15), it is determined that retrieval of the entire pages of the original document G mounted on the document mount portion 4 has been completed. Accordingly, the image reading routine of FIG. 10 is ended.

The above-described image reading routine of FIG. 10 is repeatedly executed every time a certain original document G is mounted on the document mount portion 4 to be read for facsimile operation, copy operation, or scanner operation.

The lower reference voltage setting process of S12 will be described below with reference to FIG. 11.

During this process, the lamp 19a is first turned OFF in S21 to bring the CCD 19d into a dark condition to output its lower limit voltage as the input voltage data. All the light conversion elements in the CCD 19d output the input voltage data (lower limit voltage) of the same value. The input voltage data is inputted to the terminal Vin of the A/D converter 41a. Next in S22, a six bit numeral value, which is presently being stored in the lower storage memory 13d, is written into the lower reference voltage memory 13c. The D/A converter 41c is caused to generate a lower reference voltage (temporary lower reference voltage) whose amount corresponds to the numeral value thus stored in the memory 13c. It is noted that when the present image reading routine of FIG. 10 is executed at a first time after the device 1 has been turned ON, the lower storage memory 13d presently stores therein the minimum six bit numeral value of "00h". Accordingly, the value of "00h" is written into the lower reference voltage memory 13c. The D/A converter 41c generates zero (0) volt. When the present image reading routine of FIG. 10 is executed after the image reading routine has been executed one or more times after the device 1 was turned ON, the lower storage memory 13d presently stores a lower reference value (six bit numeral value), which has been set in S12 of a previous image reading routine which has been performed prior to the present routine most recently. Accordingly, the lower reference voltage memory 13c is written with a lower reference value indicative of a lower reference voltage used in the previously-executed image reading routine.

Next, in S23, the increase mode flag 13e is turned OFF. Then, in S24, an interrupt routine of FIG. 12 is started to determine a lower reference voltage proper to the present condition of the CCD 19d. The present routine is placed into a standby condition (No in S25) until the interrupt routine is terminated. When it is determined that the interrupt routine is terminated (Yes in S25), then the program proceeds to S26, in which the lower reference value, which is now being set in the lower reference voltage memory 13c, is written in the lower storage memory 13d. Then, the process of FIG. 11 is ended, and the program proceeds to S13 in FIG. 10.

The interrupt routine, which is started in S24, will be described below in greater detail with reference to FIG. 12.

The interrupt routine is executed repeatedly and periodically at a predetermined time interval until reaching an interrupt terminating process of S38 as will be described later.

At the start of the interrupt routine, the condition of the increase mode flag 13e is investigated in S31. It is noted that when the presently-executed interrupt routine is executed first after the interruption starting process of S24, the increase mode flag 13e is in the OFF condition. When the increase mode flag 13e is in the OFF condition (Yes in S31), then the program proceeds to S32. In S32, it is judged whether or not the terminal UN of the A/D converter 41a outputs an underflow detection signal. If some underflow detection signal is outputted (Yes in S32), the program proceeds to S33. In S33, the lower reference value, presently stored in the lower reference voltage memory 13c, is decremented by one (1) (six bit numeral value), in order to decrease, by a corresponding one level, the temporary lower reference voltage to be generated at the D/A converter 41c. As a result, the temporary lower reference voltage is decreased by a level of (1–0)/256 volts. At this point, the present interrupt routine is ended.

After the predetermined time has elapsed from the end of the interrupt routine, the interrupt routine is executed again. When the interrupt routine is started at this time, the temporary lower reference voltage, which is being generated by the D/A converter 41c and whose value has been reduced by one level during the previously-executed interrupt routine, has sufficiently stabilized. It is therefore possible to accurately investigate, in S32 at the present interrupt routine, whether or not the presently-set temporary lower reference voltage causes underflow.

During the process of S32, when no underflow detection signal is outputted (No in S32), it is determined that the temporary lower reference voltage becomes smaller than the input voltage being generated by the CCD 19. Therefore, the program proceeds to S34, wherein the increase mode flag 13e is turned ON so that the temporary lower reference voltage can be increased. Afterward, it is again confirmed in S35 whether or not any underflow detection signal is outputted. If no underflow detection signal is outputted at this time (No in S35), then the program proceeds to S36. In S36, the lower reference value, presently stored in the lower reference voltage memory 13c, is incremented by one (six bit numeral value). As a result, the temporary lower reference voltage, which has been temporarily smaller than the CCD's generated input voltage, is increased by one level. Then, the present interrupt routine is ended.

In the process of S31, when it is determined that the increase mode flag 13e is in the ON condition (No in S31), the program directly proceeds to S35. In S35, it is judged whether or not any underflow detection signal is detected. If some underflow detection signal is detected (Yes in S35), then it is determined that the temporary lower reference voltage, which has once become smaller than the CCD's generated input voltage, is again increased to become greater than the CCD's generated input voltage. Accordingly, the program proceeds to S37, wherein the lower reference value, presently being stored in the lower reference voltage memory 13c, is decremented by one (1) (six bit numeral value). The thus obtained lower reference value properly corresponds to the CCD's present characteristic under the dark condition. That is, the obtained lower reference value is such a value that can allow the D/A converter 41c to generate a lower reference voltage whose value is substantially equal to the input voltage presently being generated by the CCD 19d under the dark condition. The lower reference value is therefore set in the lower reference voltage memory 13c.

Figure 11:
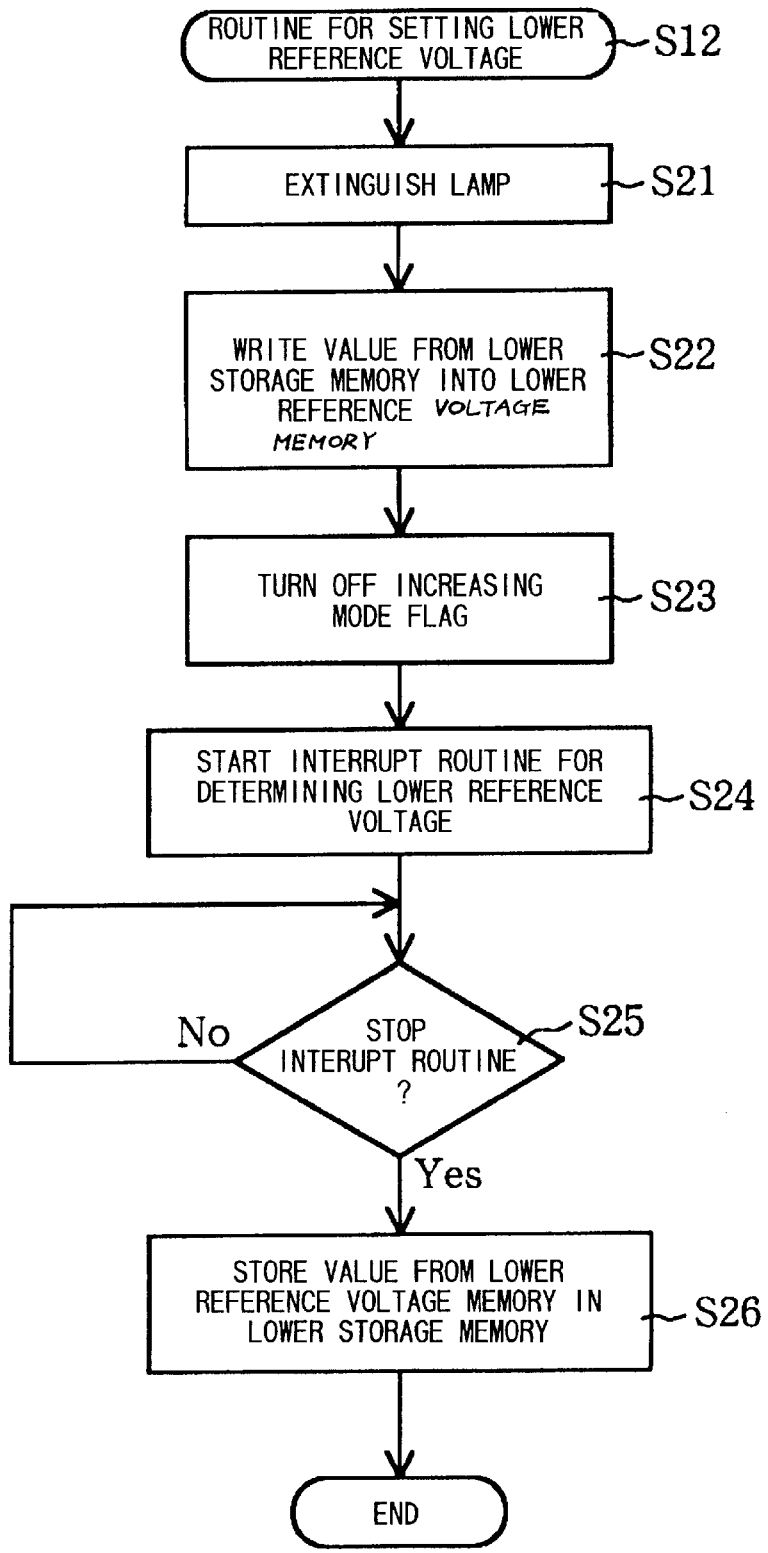
FIG. 11 is a flowchart showing the routine of S12 for setting the lower reference voltage.

Next, in S38, the interrupt routine is terminated, upon which the judgment in S25 in FIG. 11 becomes affirmative (Yes in S25), and the program proceeds to S26. In S26, the lower reference value, thus finally set in S37 in the lower reference voltage memory 13c, is written also into the lower storage memory 13d. Then, the lower reference voltage setting process of S12 is ended. During the image reading process of S14 to be executed thereafter, the D/A converter 41c will continuously generate the lower reference voltage whose amount corresponds to the lower reference value finally set in the lower reference voltage memory 13c in S37.

As described above, by repeatedly executing the interrupt routine of FIG. 12, the lower reference value can be finally determined to properly represent the present characteristic of the CCD 19d in the dark condition. The thus determined lower reference value is set in the lower reference voltage memory 13c in S37 and also stored in the lower storage memory 13d in S26. The lower reference value set in the lower reference voltage memory 13c is supplied to the terminal Din of the D/A converter 41c, which in turn supplies the A/D converter 41a with the lower reference voltage whose amount corresponds to the finally-determined lower reference value.

Thus, during the interrupt routine of FIG. 12, the lower reference value stored in the lower reference voltage memory 13c is used for indicating the amount of the temporary lower reference voltage to be repeatedly changed. The lower reference value finally determined in the interrupt routine is set also in the lower reference voltage memory 13c. Accordingly, during the image reading process of S14, the lower reference value stored in the lower reference voltage memory 13c is used for indicating the lower reference voltage capable of properly converting the CCD's generated input voltage data to numeric data.

The lower reference value finally determined in the interrupt routine is stored also in the lower storage memory 13d in S26. After one image reading process is ended and when the next image reading routine of FIG. 10 is started, the lower reference value, presently stored in the lower storage memory 13d, is used as an initial value for initially setting the temporary lower reference voltage to be used, during the interrupt routine, to update the lower reference voltage. Thus, in each image reading process of FIG. 10, the temporary lower reference voltage is initially set equal to the lower reference voltage determined and used in the previously-executed image reading process. Accordingly, it becomes possible to reduce the number of times the temporary lower reference voltage has to be changed before finally determining the lower reference voltage. It becomes possible to reduce the number of times the interrupt routine of FIG. 12 has to be executed. Accordingly, the lower reference voltage can be determined within a short period of time.

As described above, in the lower reference voltage setting process of FIG. 11, the lamp is first turned OFF in S21, and the lower reference voltage memory 13c is written with the lower reference value, which is presently stored in the lower storage memory 13b and which has been determined and set as the lower reference value during the previously-executed image reading process. The increase mode flag is turned OFF in S23, and the interrupt routine of FIG. 12 is started in S24 to determine the lower reference voltage to be used in the present image reading process. When the lower reference value is finally determined, the interrupt routine is terminated in S25, and the lower reference value is stored in the lower reference voltage memory 13c. The lower reference value is stored also in the lower storage memory 13d in S26. The lower storage memory 13d will be used in the next image reading process as a memory storing a lower reference value indicative of a temporary lower reference voltage to be initially set during the interrupt routine in that image reading process. That is, in the next image reading process, the lower reference value, stored in the lower storage memory 13d, will be written into the lower reference voltage memory 13c in S22. Accordingly, the D/A converter 41c will initially output a temporary lower reference voltage corresponding to that lower reference value. The lower reference voltage proper for being used in the present image reading process can be determined within a short period of time through repeatedly changing the temporary lower reference voltage from the thus initially-set value.

The upper reference voltage setting process of S13 will be described below with reference to FIG. 13.

During this process, the lamp 19a is first turned ON in S41 to bring the CCD 19d into a bright condition to output its upper limit voltage as the input voltage data. All the light conversion elements in the CCD 19d therefore output the input voltage data (upper limit voltage) of the same value. The input voltage data is inputted to the input terminal Vin of the A/D converter 41a. Next in S42, a six bit numeral value, which is presently being stored in the upper storage memory 13b, is written into the upper reference voltage memory 13a. The D/A converter 41b is caused to generate an upper reference voltage (temporary upper reference voltage) whose amount corresponds to the numeral value thus stored in the memory 13a. It is noted that when the present image reading routine of FIG. 10 is executed at a first time after the device 1 has been turned ON, the upper storage memory 13b presently stores therein the maximum six bit numeral value of "3Fh". Accordingly, the value of "3Fh" is written into the upper reference voltage memory 13a. The D/A converter 41b generates four (4) volts. When the present image reading routine of FIG. 10 is executed after the image reading routine has been executed one or more times after the device 1 was turned ON, the upper storage memory 13b presently stores an upper reference value (six bit numeral value), which has been set in S13 of a previous image reading routine which has been performed prior to the present routine most recently. Accordingly, the upper reference voltage memory 13a is written with an upper reference value indicative of an upper reference voltage used in the previously-executed image reading routine.

Next, in S43, the increase mode flag 13e is turned ON. Then, in S44, an interrupt routine of FIG. 14 is started to determine an upper reference voltage proper to the present condition of the CCD 19d. The present routine is placed into a standby condition (No in S45) until the interrupt routine is terminated. When it is determined that the interrupt routine is terminated (Yes in S45), then the program proceeds to S46, in which the upper reference value, which is now being set in the upper reference voltage memory 13a, is written in the upper storage memory 13b. Then, the process of FIG. 13 is ended, and the program proceeds to S14 in FIG. 10.

The interrupt routine, which is started in S44, will be described below in greater detail with reference to FIG. 14.

The interrupt routine is executed repeatedly and periodically at the predetermined time interval until reaching an interrupt terminating process of S58 as will be described later.

At the start of the interrupt routine, the condition of the increase mode flag 13e is investigated in S51. It is noted that when the presently-executed interrupt routine is executed first after the interruption starting process of S44, the increase mode flag 13e is in the ON condition. When the increase mode flag 13e is in the ON condition (Yes in S51), then the program proceeds to S52. In S52, it is judged whether or not the terminal OV of the A/D converter 41a outputs an overflow detection signal. If some overflow detection signal is outputted (Yes in S52), the program proceeds to S53. In S53, the upper reference value, presently stored in the upper reference voltage memory 13a, is incremented by one (1) (six bit numeral value), in order to increase, by a corresponding one level, the temporary upper reference voltage to be generated at the D/A converter 41b.

As a result, the temporary upper reference voltage is increased by one level of (4−2)/256 volts. At this point, the present interrupt routine is ended.

After the predetermined time has elapsed from the end of the interrupt routine, the interrupt routine is executed again. When the interrupt routine is started at this time, the temporary upper reference voltage, which is being generated by the D/A converter 41b and whose value has been increased by one level during the previously-executed interrupt routine, has sufficiently stabilized. It is therefore possible to accurately investigate, in S52 at the present interrupt routine, whether or not the presently-set temporary upper reference voltage causes overflow.

During the process of S52, when no overflow detection signal is outputted (No in S52), it is determined that the temporary upper reference voltage becomes greater than the input voltage being generated by the CCD 19. Therefore, the program proceeds to S54, wherein the increase mode flag 13e is turned OFF so that the temporary upper reference voltage can be decreased. Afterward, it is again confirmed in S55 whether or not any overflow detection signal is outputted. If no overflow detection signal is outputted at this time (No in S55), then the program proceeds to S56. In S56, the upper reference value, presently stored in the upper reference voltage memory 13a, is decremented by one (six bit numeral value). As a result, the temporary upper reference voltage, which has been temporarily greater than the CCD's generated input voltage, is decreased by one level. Then, the present interrupt routine is ended.

In the process of S51, when it is determined that the increase mode flag 13e is in the OFF condition (No in S51), the program directly proceeds to S55. In S55, it is judged whether or not any overflow detection signal is detected. If some overflow detection signal is detected (Yes in S55), then it is determined that the temporary upper reference voltage, which has once become greater than the CCD's generated input voltage, is again decreased to become smaller than the CCD's generated input voltage. Accordingly, the program proceeds to S57, wherein the upper reference value, presently being stored in the upper reference voltage memory 13a, is incremented by one (six bit numeral value). The thus obtained upper reference value properly corresponds to the CCD's present characteristic under the bright condition. That is, the obtained upper reference value is such a value that can allow the D/A converter 41b to generate an upper reference voltage whose value is substantially equal to the input voltage presently being generated by the CCD 19d under the bright condition. The upper reference value is therefore set in the upper reference voltage memory 13a.

Figure 13:
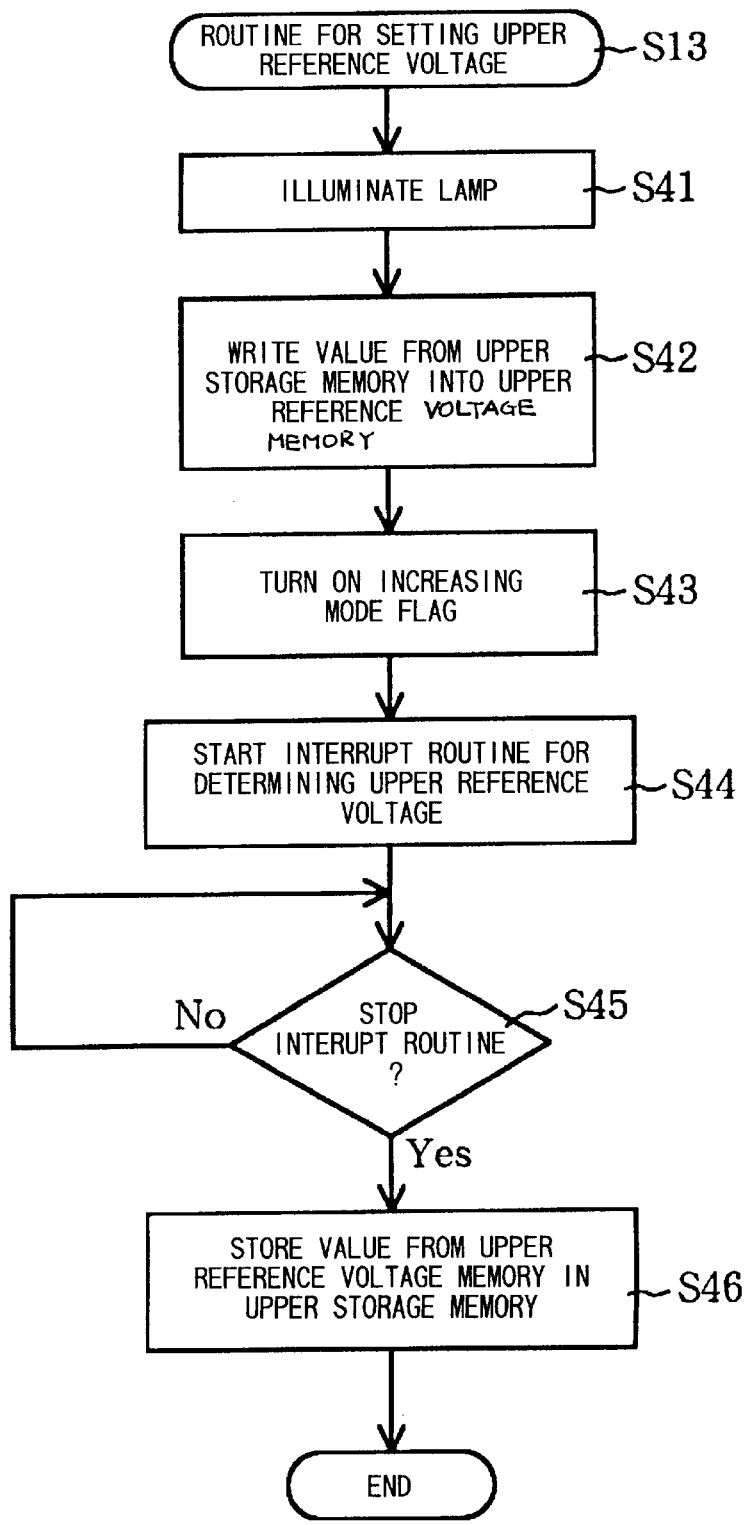
FIG. 13 is a flowchart showing the routine of S13 for setting the upper reference voltage.

Next, in S58, the interrupt routine is terminated, upon which the judgment in S45 in FIG. 13 becomes affirmative (Yes in S45), and the program proceeds to S46. In S46, the upper reference value, thus finally set in S57 in the upper reference voltage memory 13a, is written also into the upper storage memory 13b. Then, the upper reference voltage setting process of S13 is ended. During the image reading process of S14 to be executed thereafter, the D/A converter 41b will continuously generate the upper reference voltage whose amount corresponds to the upper reference value finally set in the upper reference voltage memory 13a in S57.

As described above, by repeatedly executing the interrupt routine of FIG. 14, the upper reference value can be finally determined to properly represent the present characteristic of the CCD 19d in the bright condition. The thus determined upper reference value is set in the upper reference voltage memory 13a in S57 and also stored in the upper storage memory 13b in S46. The upper reference value set in the upper reference voltage memory 13a is supplied to the terminal Din of the D/A converter 41b, which in turn supplies the A/D converter 41a with the upper reference voltage whose amount corresponds to the finally-determined upper reference value.

Thus, during the interrupt routine of FIG. 14, the upper reference value stored in the upper reference voltage memory 13a is used for indicating the amount of the temporary upper reference voltage to be repeatedly changed. The upper reference value finally determined in the interrupt routine is set also in the upper reference voltage memory 13a. Accordingly, during the image reading process of S14, the upper reference value stored in the upper reference voltage memory 13a is used for indicating the upper reference voltage capable of properly converting the CCD's generated input voltage data to numeric data.

The upper reference value finally determined in the interrupt routine is stored also in the upper storage memory 13b in S46. After one image reading process is ended and when the next image reading routine of FIG. 10 is started, the upper reference value, presently stored in the upper storage memory 13b, is used as an initial value for initially setting the temporary upper reference voltage to be used, during the interrupt routine, to update the upper reference voltage. Thus, in each image reading process of FIG. 10, the temporary upper reference voltage is initially set equal to the upper reference voltage determined and used in the previously-executed image reading process. Accordingly, it becomes possible to reduce the number of times the temporary upper reference voltage has to be changed before finally determining the upper reference voltage. It becomes possible to reduce the number of times the interrupt routine of FIG. 12 has to be executed. Accordingly, the upper reference voltage can be determined within a short period of time.

As described above, in the upper reference voltage setting process of FIG. 13, the lamp is first turned ON in S41, and the upper reference voltage memory 13a is written with the upper reference value, which is presently stored in the upper storage memory 13b and which has been determined and set as the upper reference value during the previously-executed image reading process. The increase mode flag is turned ON in S43, and the interrupt routine of FIG. 14 is started in S44 to determine the upper reference voltage to be used in the present image reading process. When the upper reference value is finally determined, the interrupt routine is terminated in S45, and the upper reference value is stored in the upper reference voltage memory 13a. The upper reference value is stored also in the upper storage memory 13b in S46. The upper storage memory 13b will be used in the next image reading process as a memory storing an upper reference value indicative of a temporary upper reference voltage to be initially set during the interrupt routine in that image reading process. That is, in the next image reading process, the upper reference value, stored in the upper storage memory 13b, will be written into the upper reference value memory 13a in S42. Accordingly, the D/A converter 41b will initially output a temporary upper reference voltage corresponding to that upper reference value. The upper reference voltage proper for being used in the present image reading process can be determined within a short period of time through repeatedly changing the temporary upper reference voltage from the thus initially-set value.

Figure 8:
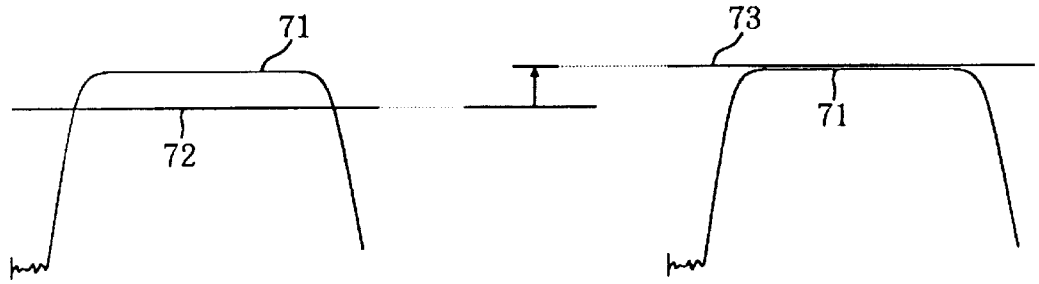
FIGS. 8(*a*) and 8(*b*) are schematic views showing how the upper reference voltage is determined according to the present embodiment, wherein FIG. 8(*a*) shows an initial relationship between a temporary upper reference voltage and a CCD's generated voltage, and FIG. 8(*b*) shows a final relationship between the determined upper reference voltage and the CCD's generated voltage.
Figure 8:
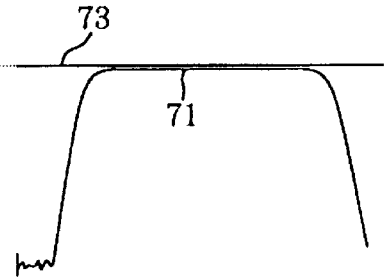

With the above-described control operation, in each image reading process of FIG. 10, the upper reference voltage can be determined in a manner shown in FIGS. 8(a) and 8(b) during the upper reference voltage setting process of S13. As shown in FIG. 8(a), the CCD 19d produces an input voltage 71 upon receiving light R reflected from the white reference plate 37. The D/A converter 41b initially outputs a temporary upper reference voltage 72 based on the upper reference value presently stored in the upper storage memory 13b. The upper reference value, stored in the upper storage memory 13b, is equal to the upper reference value which has been finally determined during the previously- and most recently- executed image reading process. Accordingly, the initially-generated temporary upper reference voltage 72 is sufficiently near to the CCD's generated voltage 71.

During the interrupt routines in the process of S13, the temporary upper reference voltage is changed one level at a time from the initial level 72 until finally reaching the level 73 that is substantially equal to the input voltage 71 and that can cause no overflow detection signal as shown in FIG. 8(b). Because the initial value 72 is near to the CCD's generated value, a difference between the initial value 72 and the finally-determined value 73 is sufficiently small that the final value 73 can be obtained through execution of the small number of interrupt routines. The upper reference voltage 73 can be determined within a short period of time. The lower reference voltage can also be determined within a short period of time for the same reason as described above.

As described above, according to the present embodiment, the processes of FIGS. 11–14 serve to set upper and lower reference voltages to be used in each image reading process of FIG. 10. The processes in S32 and in S35 serve to compare the input voltage generated by the CCD 19 with the temporary lower reference voltage outputted from the D/A converter 41c. The processes in S52 and in S55 serve to compare the input voltage generated by the CCD 19 with the temporary upper reference voltage outputted from the D/A converter 41b. The processes of S36 and S53 serve to increase the temporary lower and upper reference voltages. The processes of S33 and S56 serve to decrease the temporary lower and upper reference voltages. The processes of S37 and S57 serve to finally determine the lower and upper reference voltages. The processes of S22 and S42 serve to initially set the temporary lower and upper reference voltages.

With the above-described control, the A/D converter 41 of the present embodiment determines the lower and upper reference voltages through the interrupt routines of S12 and S13. More specifically, the A/D converter 41 changes the lower and upper temporary reference voltages in accordance with changes in the lower and upper reference values in the memories 13c and 13a until the A/D converter 41 can finally produce lower and upper reference voltages proper to convert the analog voltage from the CCD 19d into eight bit numeric data. During the image reading process of S14, the A/D converter 41 properly converts the analog voltage data from the CCD 19d into eight bit numeric data with using the thus determined lower and upper reference voltages through the already-described formula (1).

As described above, according to the present embodiment, the CCD reads an original image by converting the original image into voltage data. The D/A converters 41b and 41c supply reference voltages. The values of the reference voltages (succeeding reference voltages) to be used in a succeeding image reading process are set based on preceding reference voltages used in preceding image reading processes. The voltage data is converted into numeric data while referring to the reference voltages. Thus, the reference voltages, to be used during the present image reading process for converting the CCD's generated input voltage data into numeric data, are set based on the reference voltages which have been set during the previously-executed image reading process. Therefore, the reference voltages can be set within a short period of time.

The memories 13a and 13c store temporary reference voltages. The A/D converter 41a serves to compare the values of the temporary reference voltages with input voltages produced by the CCD in the bright and dark conditions, respectively. When the temporary reference voltage is smaller than the input voltage, the value of the temporary reference voltage is increased. When the temporary reference voltage is larger than the input voltage, the value of the temporary reference voltage is decreased. The increase and decrease of the temporary reference voltages are repeatedly performed. When the temporary reference voltages become substantially the same as the input voltages, the values of the temporary reference voltages are set as reference voltages to be used during the present image reading process. The determined reference voltages are stored in the memories 13a and 13c, and are stored also in the memories 13b and 13d as initial values of the temporary reference voltages to be used in the next image reading process.

Thus, in each image reading process, reference voltages set during the previously-executed image reading process are used as initial values of the temporary reference voltages to be used for determining the reference voltages for the present image reading process. Accordingly, the initial values of the temporary reference voltages can be set sufficiently near to the reference voltages to be finally determined at the present process. The number of times the temporary reference voltages has to be changed before finally determining the reference voltages can be reduced, and the reference voltages can be determined within a shorter period of time.

The comparison processes of S32, S35, S52, and S55, the temporary voltage increasing processes of S36 and S53, and the temporary voltage decreasing processes of S33 and S56 are operated in periodically-executed interrupt routines so that each temporary reference voltage is increased or decreased during one interrupt routine and so that the increased or decreased temporary reference voltage will be compared with the input voltage in the next interrupt routine.

Thus, during the periodically-executed interrupt routines, the temporary reference voltage is repeatedly changed in S33, S36, S53, and S56 and compared with the CCD's generated voltage in S32, S35, S52, and S55. When the temporary reference voltage is changed at a certain interrupt routine, the changed reference voltage will be compared with the CCD's generated voltage at the next interrupt routine. Because the next interrupt routine is executed after the predetermined time interval elapses after the ending of the subject interrupt routine. Accordingly, the temporary reference voltage can be compared to the CCD's generated voltage after the temporary reference voltage has sufficiently stabilized. Still, the temporary reference voltage can be compared to the CCD's generated voltage under the same condition, that is, while the original is being introduced into the scanner 19. Accordingly, the reference voltage can be reliably and accurately determined during the periodically-executed interrupt routines.

While the invention has been described in detail with reference to the specific embodiment thereof, it would be apparent to those skilled in the art that various changes and modifications may be made therein without departing from the spirit of the invention, the scope of which is defined by the attached claims.

For example, in the above-described embodiment, the upper storage memory 13b and the lower storage memory 13d are provided for storing data of the reference voltages determined in preceding determination processes. However, the storage memories 13b and 13d can be omitted. In this modification, the processes performed in S22 and S26 of FIG. 11 and the processes of S42 and S46 in FIG. 13 are omitted. In addition, during the process of FIG. 9, the upper reference voltage memory 13a is initially set in S1 to the value of "00h," and the lower reference voltage memory 13c is initially set in S2 to the value of "3Fh." The upper and lower reference voltage memories 13a and 13c serve to maintain reference voltages, which are used during the presently-executed image reading processes of FIG. 10, until the next image reading processes of FIG. 10 starts, and serve to use the maintained reference voltages as initial temporary reference voltages.

The present invention can be applied to an image reading device which is capable of reading an image in full color. In this case, three lamps 19a are provided in the scanner 19. That is, a red lamp, a blue lamp, and a yellow lamp are provided in the scanner 19. In order to determine the upper and lower reference voltages, each lamp is illuminated and extinguished individually so that the upper and lower reference voltages can be determined for all the three colors.

In the above-described embodiment, the single upper reference voltage is determined for all the light conversion elements in the CCD 19d. The single lower reference voltage is determined for all the light conversion elements in the CCD 19d. Accordingly, in S14, input voltage data outputted from each of the light conversion elements in the CCD 19d is converted into numeric data through the formula (1) with using the single lower reference voltage determined in S12 and the single upper reference voltage determined in S13.

However, the lower and upper reference voltages may be determined in S12 and S13 for each of the light conversion elements in the CCD 19d. That is, the processes of S12 and S13 may be performed onto each light conversion element. This modification can determine the upper and lower reference voltages more proper to the respective light conversion elements. That is, when the properties of the respective light conversion elements are different from one another, the respective light conversion elements may produce voltage data of different values in each of the dark and bright conditions. Accordingly, in this modification, upper and lower reference voltages are determined for each light conversion element in S12 and S13 in correspondence with the property of the each light conversion element. For each light conversion element, the formula (1) is calculated with using the thus determined upper and lower reference voltages.

In the above-described embodiment, the distortion compensation unit 42 and the gamma compensation unit 43 are provided in the image scanner 19. However, the units 42 and 43 may be omitted. The numeric data outputted from the A/D converter 41 may be directly binarized into binary data by the binarization unit 44. The binary data is transferred to and stored in the image memory 13f as image data. Or, the numeric data may be directly transferred to the image memory 13f. The numeric data is stored as image data in the image memory 13f.

What is claimed is:

1. An image reading device comprising:

reading means capable of reading an original image through converting the original image into voltage data;

reference voltage supply means capable of supplying a reference voltage;

conversion means capable of receiving the voltage data and the reference voltage and converting the voltage data into numeric data with referring to the reference voltage;

reference voltage setting means setting a value of the reference voltage to be supplied from the reference voltage supply means;

memory means capable of storing a value of the set reference voltage; and image reading control means for performing successively-executed image reading processes by repeatedly controlling the reading means to convert original images into voltage data, the reference voltage supply means to supply the reference voltage, and the conversion means to convert the voltage data into the numeric data with referring to the reference voltage, the image reading control means controlling the reference voltage setting means to perform a reference voltage setting operation to set the reference voltage to be used during one image reading process, by initially setting, as an initial value, a temporary reference voltage whose value is equal to the value of the reference voltage that is stored in the memory means and that is supplied from the reference voltage supply means during another image reading process which is performed before the subject image reading process, and by adjusting the thus initially-set temporary reference voltage value to determine the value of the reference voltage to be supplied from the reference voltage supply means during the subject image reading process.

2. An image reading device as claimed in claim 1, wherein the reference voltage setting means performs its reference voltage value setting operation during each image reading process to set the value of the reference voltage to be used for the subject image reading process.

3. An image reading device as claimed in claim 2, wherein the reading means is capable of producing first voltage data at a first predetermined condition, the reference voltage setting means setting the value of the reference voltage to be substantially equal to the first voltage data.

4. An image reading device as claimed in claim 3, wherein the reference voltage setting means includes:

reading control means for controlling the reading means into the first predetermined condition, thereby allowing the reading means to produce the first voltage data;

comparison means capable of comparing the temporary reference voltage with the first voltage data;

temporary voltage changing means capable of changing the temporary reference voltage by a predetermined level;

interrupt routine execution means for periodically executing an interrupt routine for controlling the comparison means to compare the temporary reference voltage with the first voltage data and the temporary voltage changing means to change the temporary reference voltage by the predetermined level so that the temporary reference voltage changed at each interrupt routine will be compared with the first voltage data at a subsequently-executed interrupt routine, the interrupt routine execution means periodically executing the interrupt routine until the temporary reference voltage becomes substantially equal to the first voltage data;

determination means for, when the temporary reference voltage becomes substantially equal to the first voltage data, determining the temporary reference voltage as the reference voltage to be used for the present image reading process; and initial temporary voltage setting means for setting the determined reference voltage as the temporary reference voltage to be initially compared by the comparison means with the first voltage data in an interrupt routine to be executed by the interrupt routine execution means at a first time during the next image reading process.

5. An image reading device as claimed in claim 3, wherein the reference voltage setting means includes:

reading control means for controlling the reading means into the first predetermined condition, thereby allowing the reading means to produce the first voltage data;

comparison means for comparing the temporary reference voltage with the first voltage data;

temporary voltage changing means for repeatedly changing the temporary reference voltage based on the compared results until the temporary reference voltage becomes substantially equal to the first voltage data;

determination means for, when the temporary reference voltage becomes substantially equal to the first voltage data, determining the temporary reference voltage as the reference voltage to be used for the present image reading process; and initial temporary voltage setting means for setting the determined reference voltage as the temporary reference voltage to be initially compared by the comparison means with the first voltage data during the next image reading process.

6. An image reading device as claimed in claim 5, wherein the memory means includes reference voltage memory means for storing data of the reference voltage determined by the determination means.

7. An image reading device as claimed in claim 6, wherein the memory means further includes initial temporary voltage memory means for maintaining the temporary reference voltage set by the initial temporary voltage setting means until the next image reading process.

8. An image reading device as claimed in claim 7, wherein the temporary voltage changing means repeatedly changes the temporary reference voltage by a predetermined level at a time until the temporary reference voltage becomes substantially equal to the first voltage data.

9. An image reading device as claimed in claim 8, wherein the temporary voltage changing means includes:

temporary voltage increasing means capable of increasing the temporary reference voltage by the predetermined level at a time;

temporary voltage decreasing means capable of decreasing the temporary reference voltage by the predetermined level at a time; and control means for controlling the temporary voltage increasing means to increase the temporary reference voltage by the predetermined level when the comparison means detects that the temporary reference voltage is lower than the first voltage data and for controlling the temporary voltage decreasing means to decrease the temporary reference voltage by the predetermined level when the comparison means detects that the temporary reference voltage is greater than the first voltage data.

10. An image reading device, comprising reading means capable of reading an original image through converting the original image into voltage data, said reading means capable of producing first voltage data at a first predetermined condition and capable of producing second voltage data at a second predetermined condition;

reference voltage supply means being capable of supplying first and second reference voltages;

conversion means being capable of receiving the voltage data and the reference voltage and converting the voltage data into numeric data with referring to the first and second reference voltages; and image reading control means performing successively-executed image reading processes through repeatedly controlling the reading means to convert the original image into voltage data, the reference voltage supply means to supply the first and second reference voltages, and the conversion means to convert the voltage data into the numeric data with referring to the first and second reference voltages, the image reading control means setting values of the first and second reference voltages, to be supplied from the reference voltage supply means at each image reading process, based on other values of the first and second reference voltages supplied from the reference voltage supply means at another image reading process which is performed immediately before the each image reading process.

11. An image reading device as claimed in claim 10, wherein the image reading control means includes reference voltage setting means for being executed at each image reading process to set the values of the first and second reference voltages to be used for the subject image reading process based on the values of the first and second reference voltages used at the most recently-performed image reading process, the reference voltage setting means setting the values of the first and second reference voltages to be substantially equal to the first and second voltage data, respectively.

12. An image reading device as claimed in claim 11, wherein the reference voltage setting means includes:

reading control means for controlling the reading means into the first predetermined condition, thereby allowing the reading means to produce the first voltage data, and for controlling the reading means into the second predetermined condition, thereby allowing the reading means to produce the second voltage data;

comparison means capable of comparing first and second temporary reference voltages with the first and second voltage data, respectively;

temporary voltage changing means capable of changing each of the first and second temporary reference voltages by a predetermined level;

first interrupt routine execution means for periodically executing a first interrupt routine for controlling the comparison means to compare the first temporary reference voltage with the first voltage data and the temporary voltage changing means to change the first temporary reference voltage by the predetermined level so that the first temporary reference voltage changed at each first interrupt routine will be compared with the first voltage data at a subsequently-executed first interrupt routine, the first interrupt routine execution means periodically executing the first interrupt routine until the first temporary reference voltage becomes substantially equal to the first voltage data;

second interrupt routine execution means for periodically executing a second interrupt routine for controlling the comparison means to compare the second temporary reference voltage with the second voltage data and the temporary voltage changing means to change the second temporary reference voltage by the predetermined level so that the second temporary reference voltage changed at each second interrupt routine will be compared with the second voltage data at a subsequently-executed second interrupt routine, the second interrupt routine execution means periodically executing the second interrupt routine until the second temporary reference voltage becomes substantially equal to the second voltage data;

determination means for, when the first temporary reference voltage becomes substantially equal to the first voltage data, determining the first temporary reference voltage as the first reference voltage to be used for the present image reading process, and for, when the second temporary reference voltage becomes substantially equal to the second voltage data, determining the second temporary reference voltage as the second reference voltage to be used for the present image reading process; and initial temporary voltage setting means for setting the determined first reference voltage as the first temporary reference voltage to be initially compared by the comparison means with the first voltage data in the first interrupt routine to be executed by the first interrupt routine execution means at a first time during the next image reading process, and for setting the determined second reference voltage as the second temporary reference voltage to be initially compared by the comparison means with the second voltage data in the second interrupt routine to be executed by the second interrupt routine execution means at a first time during the next image reading process.

13. An image reading device as claimed in claim 11, wherein the reference voltage setting means includes:

reading control means for controlling the reading means into the first predetermined condition, thereby allowing the reading means to produce the first voltage data, and for controlling the reading means into the second predetermined condition, thereby allowing the reading means to produce the second voltage data;

comparison means for comparing first and second temporary reference voltages with the first and second voltage data, respectively;

temporary voltage changing means for repeatedly changing the first and second temporary reference voltages based on the compared results until the first and second temporary reference voltages become substantially equal to the first and second voltage data, respectively;

determination means for, when the first temporary reference voltage becomes substantially equal to the first voltage data, determining the first temporary reference voltage as the first reference voltage to be used for the present image reading process, and for, when the second temporary reference voltage becomes substantially equal to the second voltage data, determining the second temporary reference voltage as the second reference voltage to be used for the present image reading process; and initial temporary voltage setting means for setting the determined first and second reference voltages as the first and second temporary reference voltages to be initially compared by the comparison means with the first voltage data and the second voltage data during the next image reading process.

14. An image reading device as claimed in claim 13, wherein the reference voltage setting means further includes reference voltage memory means for storing data of the first and second reference voltages determined by the determination means.

15. An image reading device as claimed in claim 14, wherein the reference voltage setting means further includes initial temporary voltage memory means for maintaining the first and second temporary reference voltages set by the initial temporary voltage setting means until the next image reading process.

16. An image reading device as claimed in claim 15, wherein the temporary voltage changing means repeatedly changes the first temporary reference voltage by a predetermined level at a time until the first temporary reference voltage becomes substantially equal to the first voltage data, and repeatedly changes the second temporary reference voltage by the predetermined level at a time until the second temporary reference voltage becomes substantially equal to the second voltage data.

17. An image reading device as claimed in claim 16, wherein the temporary voltage changing means includes:
temporary voltage increasing means capable of increasing each of the first and second temporary reference voltages by the predetermined level at a time;
temporary voltage decreasing means capable of decreasing each of the first and second temporary reference voltages by the predetermined level at a time; and
control means for controlling the temporary voltage increasing means to increase the first temporary reference voltage by the predetermined level when the comparison means detects that the first temporary reference voltage is lower than the first voltage data, for controlling the temporary voltage decreasing means to decrease the first temporary reference voltage by the predetermined level when the comparison means detects that the first temporary reference voltage is greater than the first voltage data, for controlling the temporary voltage increasing means to increase the second temporary reference voltage by the predetermined level when the comparison means detects that the second temporary reference voltage is lower than the second voltage data, and for controlling the temporary voltage decreasing means to decrease the second temporary reference voltage by the predetermined level when the comparison means detects that the second temporary reference voltage is greater than the second voltage data.

18. An image reading device as claimed in claim 11, wherein the voltage data produced by the reading means is in a range of minimum voltage data and maximum voltage data, the first voltage data being equal to the minimum voltage data and the second voltage data being equal to the maximum voltage data.

19. An image reading device as claimed in claim 18, wherein the reading means includes light conversion means capable of receiving light supplied from the original image and converting intensity of the received light into voltage data, indicative of the intensity of the received light, in the range of the minimum and maximum voltage data.

20. An image reading device as claimed in claim 19, wherein the reading means further includes:
original transporting means for transporting an original bearing the original image thereon to a predetermined image reading position;
a light source capable of irradiating light onto the image reading position;
a white reference plate provided on the image reading position; and
a CCD provided for receiving light reflected from the image reading position and for converting intensity of the received light into voltage data indicative of the intensity of the received light,
wherein the reference voltage setting means controls, when the original is not transported to the image reading position, the CCD to produce the first voltage data while controlling the light source to turn OFF and controls the CCD to produce the second voltage data while controlling the light source to turn ON.

21. An image reading device, comprising:
reading means for successively performing image reading processes, the reading means reading, during each image reading process, an original image by converting the original image into voltage data;
reference voltage supply means for supplying a reference voltage during each image reading process;
reference voltage setting means for setting, during each image reading process, a value of the reference voltage to be supplied by the reference voltage supply means during the subject image reading process, the reference voltage setting means including memory means for storing the value of the reference voltage set during each image reading process, the reference voltage setting means setting the value of the reference voltage for each image reading process by setting, as an initial value, another value of the reference voltage, which the reference voltage setting means has set during another image reading process that precedes the subject image reading process and which is stored in the memory means and by adjusting the initial value; and
conversion means for receiving, during each image reading process, the voltage data and the reference voltage, whose value is set by the reference voltage setting means, and for converting the voltage data into numeric data with referring to the reference voltage.

22. An image reading device, comprising:
reading means for reading an original image by converting the original image into voltage data;
reference voltage supply means for supplying a reference voltage;
reference voltage setting means for setting a value of the reference voltage supplied by the reference voltage supply means, the reference voltage setting means setting a succeeding reference voltage based on a preceding reference voltage; and
conversion means for receiving the voltage data and the reference voltage, whose value is set by the reference voltage setting mean, and for converting the voltage data into numeric data with referring to the reference voltage; wherein the reference voltage setting means includes:
temporary voltage memory means for storing a temporary reference voltage;
comparison means for comparing the value of the temporary reference voltage with an input voltage produced by the reading means in a predetermined condition;
temporary voltage value increasing means for, when the results of the comparison performed by the comparison means show that the temporary reference voltage is smaller than the input voltage, increasing the value of the temporary reference voltage stored in the temporary voltage memory;

temporary voltage decreasing means for, when the results of the comparison performed by the comparison means show that the temporary reference voltage is larger than the input voltage, decreasing the value of the temporary reference voltage stored in the temporary voltage memory;

determination means for repeatedly operating the temporary voltage increasing means and the temporary voltage decreasing means and setting the value of the temporary reference voltage as the reference voltage when the temporary reference voltage stored in the temporary voltage memory becomes substantially the same as the input voltage;

voltage memory means for storing the reference voltage set by the determination means; and initial value setting means for setting, into the temporary voltage memory means, the reference voltage stored in the voltage memory means, as an initial value of the temporary reference voltage.

23. An image reading device as claimed in claim 22, wherein the comparison means, the temporary voltage increasing means, and the temporary voltage decreasing means are operated by periodically-executed interrupt routine so that the temporary reference voltage is increased or decreased during one interrupt routine by the temporary voltage increasing means or the temporary voltage decreasing means and so that the comparison means compares the increased or decreased temporary reference voltage with the input voltage in the next interrupt routine.

24. An image reading device, comprising:

reading means for reading an original image by converting the original image into voltage data;

reference voltage supply means supplying first and second reference voltages;

reference voltage setting means setting values of the first and second reference voltages supplied by the reference voltage supply means;

conversion means receiving the voltage data and first and second reference voltages, whose values are set by the reference voltage setting means, and converting the voltage data into numeric data with referring to the first and second reference voltages, wherein the reading means includes:

original transporting means for transporting an original bearing the original image thereon to a predetermined image reading position;

a light source capable of irradiating light onto the image reading position;

a white reference plate provided on the image reading position; and light conversion means provided for receiving light reflected from the image reading position and for converting intensity of the received light into voltage data indicative of the intensity of the received light, wherein the reference voltage setting means includes:

control means for controlling, before the original reaches the image reading position by the original transporting means, the light conversion means to produce first input voltage while controlling the light source to turn OFF and controls the light conversion means to produce second input voltage while controlling the light source to turn ON;

temporary voltage memory means for storing first and second temporary reference voltages;

comparison means for comparing the value of the first temporary reference voltage with the first input voltage, and for comparing the value of the second temporary reference voltage with the second input voltage;

first temporary voltage value increasing means for, when the result of the comparison performed by the comparison means shows that the first temporary reference voltage is smaller than the first input voltage, increasing the value of the first temporary reference voltage stored in the temporary voltage memory;

second temporary voltage value increasing means for, when the result of the comparison performed by the comparison means shows that the second temporary reference voltage is smaller than the second input voltage, increasing the value of the second temporary reference voltage stored in the temporary voltage memory;

first temporary voltage decreasing means for, when the result of the comparison performed by the comparison means shows that the first temporary reference voltage is larger than the first input voltage, decreasing the value of the first temporary reference voltage stored in the temporary voltage memory;

second temporary voltage decreasing means for, when the result of the comparison performed by the comparison means shows that the second temporary reference voltage is larger than the second input voltage, decreasing the value of the second temporary reference voltage stored in the temporary voltage memory;

determination means for repeatedly operating the first and second temporary voltage increasing means and the first and second temporary voltage decreasing means and setting the values of the first and second temporary reference voltages as the first and second reference voltages when the first and second temporary reference voltages stored in the temporary voltage memory become substantially the same as the first and second input voltages, respectively;

voltage memory means for storing the first and second reference voltages set by the determination means; and initial value setting means for setting, into the temporary voltage memory means, the first and second reference voltages stored in the voltage memory means, as initial values of the first and second temporary reference voltages.

25. An image reading device as claimed in claim 24, wherein the comparison means, the first and second temporary voltage increasing means, and the first and second temporary voltage decreasing means are operated by periodically-executed interrupt routine so that each of the first and second temporary reference voltages is increased or decreased during one interrupt routine by the corresponding temporary voltage increasing means or the corresponding temporary voltage decreasing means and so that the comparison means compares the increased or decreased temporary reference voltage with the corresponding input voltage in the next interrupt routine.

* * * * *